(12) United States Patent
Takagi

(10) Patent No.: US 9,062,187 B2
(45) Date of Patent: Jun. 23, 2015

(54) OPTICAL FILM

(75) Inventor: Takahiro Takagi, Kanagawa (JP)

(73) Assignee: KONICA MINOLTA ADVANCED LAYERS, INC., Tokyo (JP)

( * ) Notice: Subject to any disclaimer, the term of this patent is extended or adjusted under 35 U.S.C. 154(b) by 485 days.

(21) Appl. No.: 13/556,598

(22) Filed: Jul. 24, 2012

(65) Prior Publication Data

US 2012/0292580 A1 Nov. 22, 2012

(30) Foreign Application Priority Data

Feb. 2, 2010 (WO) .................. PCT/JP2010/051391

(51) Int. Cl.
| | | |
|---|---|---|
| F21V 9/00 | (2006.01) | |
| G02B 5/02 | (2006.01) | |
| G02C 7/10 | (2006.01) | |
| G02F 1/361 | (2006.01) | |
| G03B 11/00 | (2006.01) | |
| C08L 1/12 | (2006.01) | |
| G02B 27/28 | (2006.01) | |
| G02B 5/30 | (2006.01) | |
| C08K 5/06 | (2006.01) | |
| C08K 5/151 | (2006.01) | |

(52) U.S. Cl.
CPC ................. *C08L 1/12* (2013.01); *G02B 5/3083* (2013.01); *C08K 5/06* (2013.01); *C08K 5/151* (2013.01)

(58) Field of Classification Search
USPC .......... 156/306.6; 252/582, 587; 349/96, 117, 349/122; 359/483.01, 489.07, 500; 428/1.3, 428/220, 532, 910, 1.1; 106/171.1; 264/1.34, 217, 291
See application file for complete search history.

(56) References Cited

FOREIGN PATENT DOCUMENTS

| JP | 2002-187958 | 5/2002 |
|---|---|---|
| JP | 2003-215337 | 7/2003 |
| JP | 2006-323152 | 11/2006 |
| JP | 2008-013628 | 1/2008 |
| JP | 2010-001383 | 1/2010 |
| JP | 2010-002749 | 1/2010 |
| JP | 2010-031132 | 2/2010 |
| JP | 2010-072497 | 4/2010 |

*Primary Examiner* — Bijan Ahvazi
(74) *Attorney, Agent, or Firm* — Lucas & Mercanti, LLP

(57) ABSTRACT

Provided is an optical film which exhibits low internal haze, low internal scattering, and excellent moisture resistance though the film contains diacetylcellulose having excellent retardation-inducing properties. An optical film characterized by comprising: a cellulose acetate α which has a 6% viscosity of 70 to 250 mPas and a degree of acetyl substitution of 2.0 to less than 2.5; another cellulose acetate β which has a 6% viscosity lower than that of the cellulose acetate α and a degree of acetyl substitution of 2.0 to less than 2.5; ester compound C which has 1 to 12 pyranose or furanose structures of at least one kind and in which all or a part of the OH groups of the structures are esterified; and polyester D represented by Formula (1). B-(G-A)n-G-B (1).

3 Claims, 4 Drawing Sheets

OPTICAL FILM

This application is a Continuation-in-Part Application of International Application PCT/JP2010/051391 filed on Feb. 2, 2010 in Japanese Patent Office, which is incorporated herein by this reference in its entirety.

TECHNICAL FIELD

The present invention relates to an optical film employing a cellulose acetate.

BACKGROUND OF THE INVENTION

Formerly, polarizing plates used in liquid crystal display devices generally had a structure in which a polarizer obtained by adsorbing elements to a polyvinyl alcohol film was sandwiched between two triacetyl cellulose films. However, since liquid crystal display devices have come to be used for TVs, varieties of cellulose ester films provided with retardation have appeared, for example, a cellulose acetate propionate film provided with an optical compensation function, and a film obtained by adding a retardation enhancing agent in a triacetyl cellulose.

The major reason why the provision of retardation to a cellulose ester was examined was that the cellulose ester had high affinity to the polarizer composed of a polyvinyl alcohol, resulting in a high productivity of a polarizing plate.

Such a cellulose ester film provided with retardation had a high degree of substitution with an acyl group in order to maintain moisture resistance of the polarizer.

However, in accordance with the improvement in the property of liquid crystal display devices, it has become a situation in which it is difficult to fully obtain the necessary amount of retardation with conventional films, for example, a film obtained by incorporating a retardation increasing agent in a conventional cellulose acetate propionate film or a triacetyl cellulose.

Diacetyl cellulose which is a cellulose acetate obtained by decreasing the substitution degree of triacetyl cellulose (also referred to as cellulose diacetate) is easier to provide retardation when compared with a triacetyl cellulose. Accordingly, diacetyl cellulose has been known to be superior to triacetyl cellulose with respect to optical compensation, however, it has not been practically used because the problem of moisture resistance has not been overcome.

In view of such problems, in Patent document 1, proposed has been a technique to improve moisture resistance while exhibiting retardation by mixing a diacetyl cellulose with a compound having a negative birefringence and, for example, a simple sugar or an oligosaccharide.

However, according to this technique, the moisture resistance was improved, but not fully sufficient. Further, since the compatibility of the diacetyl cellulose with a simple sugar or an oligosaccharide was not enough, the internal haze or internal scattering of the film was enhanced, whereby the contrast of a liquid crystal display device when used was deteriorated.

PRIOR ART DOCUMENT

Patent Document

Patent Document 1: Japanese Patent Application Publication Open to Public Inspection (hereafter referred to as JP-A) No. 2010-2749

SUMMARY OF THE INVENTION

Problems to be Solved by the Invention

An object of the present invention is to provide an optical film exhibiting small internal haze, small internal scattering and excellent moisture resistance, while employing a diacetyl cellulose having an excellent property to provide retardation.

Means to Solve the Problems

The object of the present invention was achieved by the following structures.

1. An optical film comprising:
   cellulose acetate a having a 6% viscosity of 70 to 250 mPa·s and an acetyl substitution degree of 2.0 or more but less than 2.5;
   cellulose acetate β having a 6% viscosity smaller than the 6% viscosity of cellulose acetate α, and an acetyl substitution degree of 2.0 or more but less than 2.5;
   ester compound C having one or more but twelve or less of at least one kind of a pyranose structure and a furanose structure, all of or a part of OH groups of the at least one kind of a pyranose structure and a furanose structure being esterified; and
   polyester D represented by following Formula (I), $$B\text{-}(G\text{-}A)_n\text{-}G\text{-}B \qquad \text{Formula (1)}$$

wherein B represents an arylcarboxylic acid residue, G represents an alkylene glycol residue having 2 to 12 carbon atoms, an aryl glycol residue having 6 to 12 carbon atoms, or an oxyalkylene glycol residue having 4 to 12 carbon atoms, A represents an alkylene dicarboxylic acid residue having 4 to 12 carbon atoms, or an aryl dicarboxylic acid residue having 6 to 12 carbon atoms, and n represents an integer of 1 or more.

2. The optical film of Item 1, wherein both of cellulose acetates α and β are produced employing a wooden pulp cellulose as a raw material.

3. The optical film of Item 1 or 2, wherein
   an in-plane retardation value measured at a wavelength of 590 nm Ro (590) is 30 nm or more but 90 nm or less,
   a ratio of a retardation value in the thickness direction of the optical film measured at the wavelength of 590 nm Rth (590) to the in-plane retardation value (590) {Rth (590)/Ro (590)} is 2.0 or more but 3.0 or less, $$Ro=(nx-ny)\times d$$

$$Rth=\{(nx+ny)/2-nz\}\times d$$

(in the formulas, nx represents an in-plane refractive index in a slow axis direction, ny represents an in-plane refractive index in a fast axis direction, nz represents a refractive index in the thickness direction of the optical film and d represents a thickness of the optical film (nm)).

Effect of the Invention

According to the present invention, an optical film exhibiting small internal haze, small internal scattering and excellent moisture resistance could be obtained while employing a diacetyl cellulose having an excellent property to provide retardation.

OPTICAL FILM OF THE PRESENT INVENTION

Figure 1:
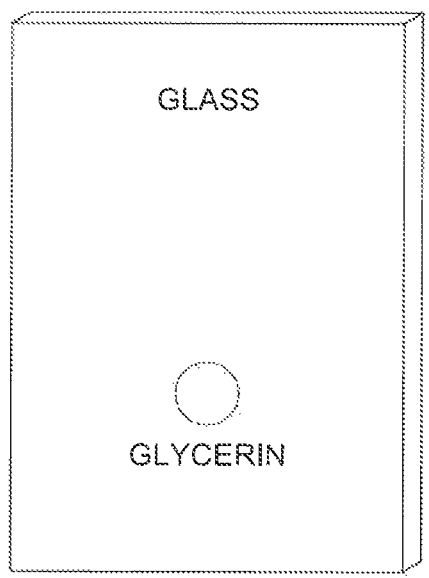
FIG. 1 is a schematic drawing illustrating a state when glycerin is dropped on a slide glass.

The optical film of the present invention is characterized in that the optical film contains: cellulose acetate a having a 6% viscosity of 70 to 250 mPa·s and an acetyl substitution degree of 2.0 or more but less than 2.5; cellulose acetate β having a 6% viscosity smaller than the 6% viscosity of cellulose acetate α, and an acetyl substitution degree of 2.0 or more but less than 2.5; ester compound C having one or more but twelve or less of at least one kind of a pyranose structure and a furanose structure, all of or a part of OH groups of the at least one kind of a pyranose structure and a furanose structure being esterified; and polyester D represented by following Formula (1) (hereafter, merely referred to as Polyester D),

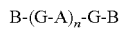
B-(G-A)$_n$-G-B    Formula (1)

wherein B represents an arylcarboxylic acid residue, G represents an alkylene glycol residue having 2 to 12 carbon atoms, an aryl glycol residue having 6 to 12 carbon atoms, or an oxyalkylene glycol residue having 4 to 12 carbon atoms, A represents an alkylene dicarboxylic acid residue having 4 to 12 carbon atoms, or an aryl dicarboxylic acid residue having 6 to 12 carbon atoms, and n represents an integer of 1 or more.

Further, as optical properties, an in-plane retardation value measured at a wavelength of 590 nm Ro (590) is 30 nm or more but 90 nm ore less, a ratio of a retardation value in the thickness direction of the optical film measured at the wavelength of 590 nm Rth (590) to the in-plane retardation value (590) {Rth (590)/Ro(590)} is 2.0 or more but 3.0 or less, Ro=(nx−ny)×d Rth={(nx+ny)/2−nz}×d (in the formulas, nx represents an in-plane refractive index in a slow axis direction, ny represents an in-plane refractive index in a fast axis direction, nz represents a refractive index in the thickness direction of the optical film and d represents a thickness of the optical film (nm)).

In the present invention, Ro is preferably 30≤Ro≤90 nm.
<Cellulose Acetate α>

The Cellulose acetate a has a 6% viscosity of 70 to 250 mPa·s, and preferably 80 to 220 mPa·s.

By adjusting the 6% viscosity within this range, it becomes possible to maintain the strength of the film. A 6% viscosity can be determined according to the following method.
(Measuring Method of 6% Viscosity)

In the present invention, the 6% viscosity means a value obtained by measuring the viscosity of a 6 mass % solution of cellulose acetate in 95% acetone using an Ostwald viscometer under the condition of 25° C.±1° C.

In a conical flask, 3.00 g of dried sample and 39.90 g of 95% acetone aqueous solution are charged, and stirred for 1.5 hours (a 6 mass/volume % solution) while being sealed with an airtight stopper. Thereafter, the sample was completely dissolved by shaking for around one hour using a rotating shaker. The obtained 6 mass/volume % solution is transferred to an Ostwald viscometer to fill up to a marked line, and subjected to temperature adjustment for 15 minutes at 25±1° C. The time of flow between the marked lines for time measurement is determined.

The 6% viscosity is calculated according to the following equation.

Six % viscosity (mPa·s)=time of flow(s)×viscometer coefficient

The viscometer coefficient is determined by measuring the time of flow using a standard solution for calibrating viscometer according to the same manner as described above.

Viscometer coefficient={absolute viscosity of standard solution (mPa·s)×density of the solution (0.827 g/cm$^3$)}/{density of the standard solution (g/cm$^3$)×time of flow of the standard solution (s)}

The cellulose acetate a of the present invention has an acetyl substitution degree of 2.0 or more but less than 2.5, and preferably 2.1 or more but less than 2.4. The acetyl substitution degree is a value determined by a method described in ASTM-D817-96.

In the present invention, the ratio of the contents of cellulose esters α and β (Cellulose acetate α):(Cellulose acetate β) is preferably from 95:5 to 5:95, and is more preferably from 90:10 to 10:90.
<Cellulose Acetate β>

Cellulose acetate β of the present invention has a feature that the 6% viscosity is smaller than that of Cellulose acetate α, and it is preferably 40 to 80 mPa·s. By mixing Cellulose acetate α with β, the compatibility with Sugar ester C can be improved.

Generally, in the production of a cellulose ester film via a solution casting method, deformation of the film may occur when the peeling strength of the film is large. Accordingly, a cellulose ester obtained by using linter as a raw material, which exhibits a relatively small peeling strength, is used (refer to JP-A No. 4-277530). However, in the present invention, further preferable results with respect to compatibility can be obtained with cellulose esters A and B employing a wooden pulp.

The reason why the peeling strength is large has been ascribed to be the effect of hemicellulose contained in wooden pulp. It is assumed that the hemicellulose has worked as a compatibilizer since the structure of a hemicellulose resembles to the structure of a cellulose ester with a smaller acetyl group substitution degree or the structure of Sugar ester C.

Both of Cellulose acetates a and (3 can be produced according to a common method, for example, a sulfuric acid catalyst method, an acetylic acid method or a methylene chloride method.

A cellulose acetate can usually be produced by activating a pulp (cellulose) using such as acetic acid (activating process), preparing triacetate with acetic acid anhydride using a sulfuric acid catalyst (acetylation process), and adjusting the acetylation degree via saponification (hydrolysis)*ripening (saponification, ripening process).

In this method, the activation process can be carried out by spraying a mist of acetic acid or aqueous acetic acid on the pulp (cellulose) or by dipping the pulp in an acetic acid or aqueous acetic acid bath. The amount of acetic acid relative to 100 parts by mass of the pulp (cellulose) is about 10 to 100 parts by mass, preferably about 20 to 80 parts by mass, and more preferably about 30 to 60 parts by mass.

The amount of acetic anhydride to be used in the acetylation process can be selected from a range conducive to the above-mentioned degree of acetylation. For example, based on 100 parts by mass of the pulp (cellulose), the amount of acetic anhydride may be 230 to 300 parts by mass, preferably 240 to 290 parts by mass, and more preferably 250 to 280 parts by mass.

In the acetylation process, acetic acid is generally used as the solvent. The amount of acetic acid to be used for this purpose may for example be 200 to 700 parts by mass, preferably 300 to 600 parts by mass, and more preferably 350 to 500 parts by mass per 100 parts by mass of the pulp (cellulose).

As an acetylation or ripening catalyst, sulfuric acid is usually employed. The amount of sulfuric acid per 100 parts by mass of cellulose is generally 1 to 15 parts by mass, preferably 5 to 15 pats by mass, and more preferably 5 to 10 parts by mass.

In order to further improve the optical characteristics of cellulose acetate, the prepared cellulose acetate may be treated with an oxidizing agent in a suitable stage of production, for example after the acetylation reaction or after the saponification ripening.

The oxidizing agent that can be used includes: hydrogen peroxide; peracids such as performic acid, peracetic acid and perbenzoic acid; and organic peroxides such as diacetyl peroxide. These oxidizing agents can be used each alone or in combination of two or more kinds.

The preferred oxidizing agent is one which can be easily removed from the cellulose acetate without leaving any appreciable residues, thus including hydrogen peroxide, performic acid and peracetic acid. Specifically preferred are hydrogen peroxide and peracetic acid. The amount of the oxidizing agent can be selected according to the required optical parameter levels, and, for example, based on 100 parts by mass of cellulose acetate, may be 0.01 to 5 parts by mass, preferably about 0.1 to 2.5 parts by mass, and particularly about 0.1 to 1 parts by mass.

The treatment with the oxidizing agent can be carried out at a temperature suited to the oxidizing agent, for example, about 20 to 100° C., and preferably about 30 to 70° C.

As Cellulose acetate α and β, commercially available cellulose acetates, for example, L-30, L-40, L-50 and L-70 (produced by Daicel Corp.) and Ca398-6, Ca398-10, Ca398-30 and Ca 394-60S (produced by Eastman Chemical Japan) are usable.

<Sugar Ester Compound C>

As the ratio of esterification, preferable is 60% or more and more preferable is 75% or more based on the number of OH groups existing in the pyranose structure or the furanose structure.

As examples of a sugar preferably used in the present invention the following compounds may be cited, however, the present invention is not limited thereto.

Examples include glucose, galactose, mannose, fructose, xylose, or arabinose, lactose, sucrose, nystose, 1F-fructosylnystose, stachyose, maltitol, lactitol, lactulose, cellobiose, maltose, cellotriose, maltotriose, raffinose and kestose.

In addition, gentiobiose, gentiotriose, gentiotetraose, xylotriose, and galactosyl-sucrose may be employed.

Among these compounds, compounds having both of the furanose structure and the pyranose structure are preferable.

As examples of the compounds, sucrose, kestose, nystose, 1F-fructosylnystose, and stachyose may be preferable, in particular, sucrose may be more preferable.

Monocarboxylic acids to be used to esterify all or a part of OH groups of the pyranose structure or the furanose structure of the present invention, are not specifically limited, and known aliphatic monocarboxylic acids, alicyclic monocarboxylic acids and aromatic monocarboxylic acids may be used. These monocarboxylic acids may be used singly or in combination of two or more kinds.

Examples of preferable aliphatic monocarboxylic acid include a saturated fatty acid such as acetic acid, propionic acid, butylic acid, isobutylic acid, valerianic acid, capronic acid, enanthic acid, caprylic acid, pelargonic acid, capric acid, 2-ethyl-hexanecarboxylic acid, undecylic acid, lauric acid; tridecylic acid, myristic acid, pentadecylic acid, palmitic acid, heptadecylic acid, stearic acid, nonadecanic acid, arachidic acid, behenic acid, lignoceric acid, cerotic acid, heptacosanoic acid, montanic acid and melissic acid, and a unsaturated fatty acid such as undecylic acid, oleic acid, sorbic acid, linolic acid, linolenic acid, arachidonic acid and octenic acid.

Examples of a preferable alicyclic monocarboxylic acid include acetic acid, cyclopentane carboxylic acid, cyclohexane carboxylic acid, cyclo octane carboxylic acid, and derivatives of them.

Examples of preferable aromatic monocarboxylic acid include benzoic acid, an aromatic monocarboxylic acid formed by introducing one to five alkyl or alkoxy groups into the benzene ring of benzoic acid such as toluic acid, an aromatic monocarboxylic acid having two or more benzene rings such as cinnamic acid, benzilie acid, biphenyl carboxylic acid, naphthalene carboxylic acid, tetralin carboxylic acid and derivatives thereof. More concretely, xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid, and p-coumaric acid. Among them, benzoic acid is particularly preferable.

The oligosaccharide can be produced by action of ferment such as amylase to starch, cane sugar and so on. Examples of oligosacchaides usable in the present invention, include marthe oligosaccharide, isomarthe oligosaccharide, fructo oligosaccharide, galact oligosaccharide, and xylo oligosaccharide.

The sugar ester compound of the present invention may be a compound in which one or more and 12 or less of at least one kind of the pyranose structure or the furanose structure represented by the following Formula (A) are condensed. In Formula (A), $R_{11}$ to $R_{15}$, and $R_{21}$ to $R_{25}$ each represents an acyl group with 2 to 22 carbon atoms or a hydrogen atom, m and n each represent an integer of 0 to 12, and m+n represents an integer of 1 to 12.

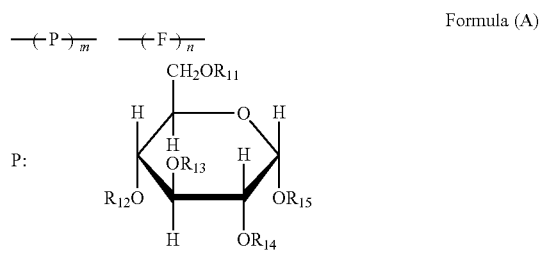

Formula (A)

F: 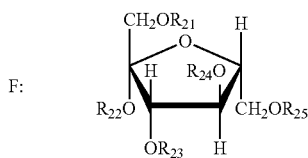

$R_{11}$ to $R_{15}$, and $R_{21}$, to $R_{25}$ may be preferably a benzoyl group or a hydrogen atom. The benzoyl group may further include a substituent $R_{26}$ (p is 0 to 5), and examples of the substituent $R_{26}$ include an alkyl group, an alkenyl group, an alkoxyl group, and a phenyl group. Furthermore, these alkyl group, alkenyl group, and phenyl group may also include a substituent. The oligosaccharide may also be produced by the same method as the production of an ester compound of the present invention.

The used amount of Sugar ester compound C is preferably from 1 mass % to 20 mass %, and particularly preferably from 3 mass % to 13 mass % base on the mass of cellulose acetate, in view of improving such as film performance, and workability.

Concrete examples of the ester compound relating to the present invention will be listed below, but the present invention is not limited to these examples.

Compound 1

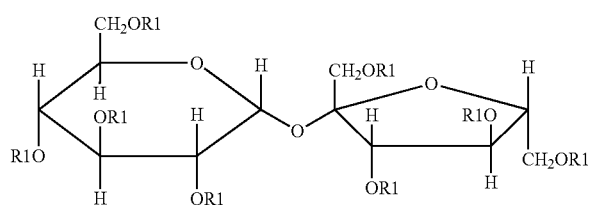 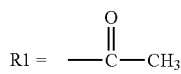

Compound 2

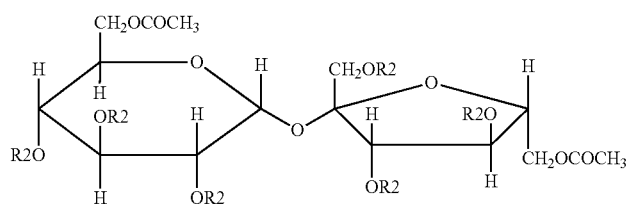 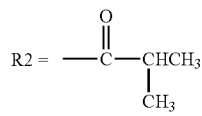

Compound 3

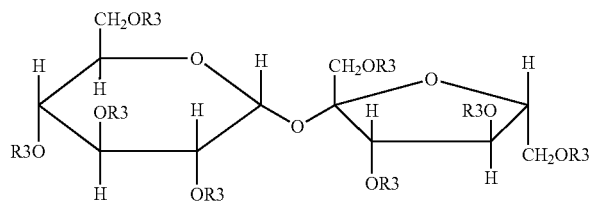 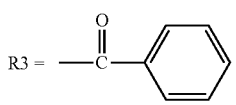

Average substitution degree 7.0

Compound 4

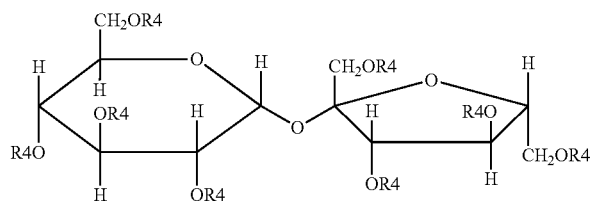 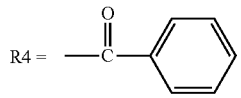

Average substitution degree 6.5

Compound 5

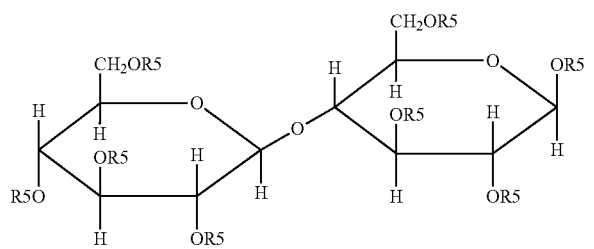 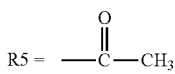

-continued
Compound 6
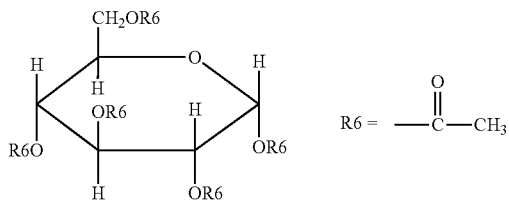 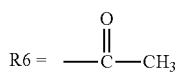
Compound 7
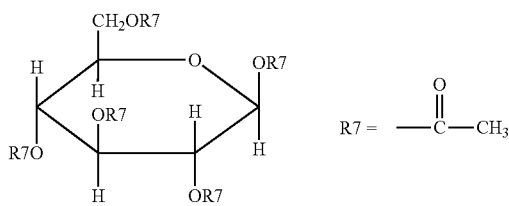 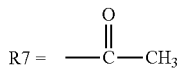
Compound 8
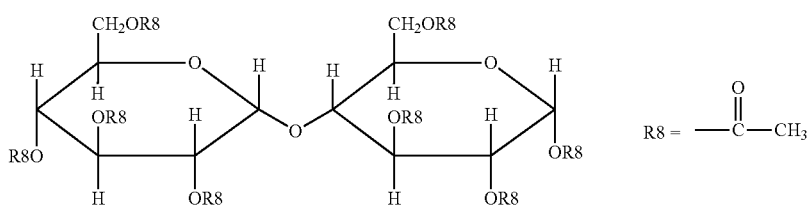 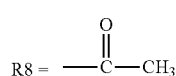
Compound 9
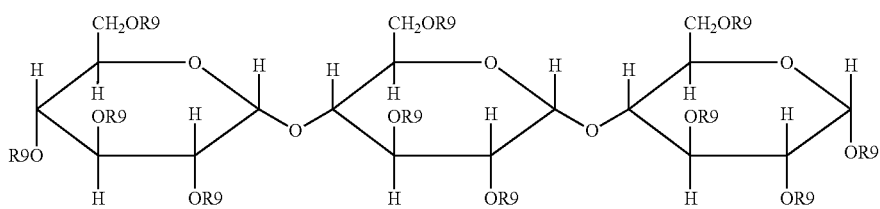 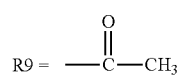
Compound 10
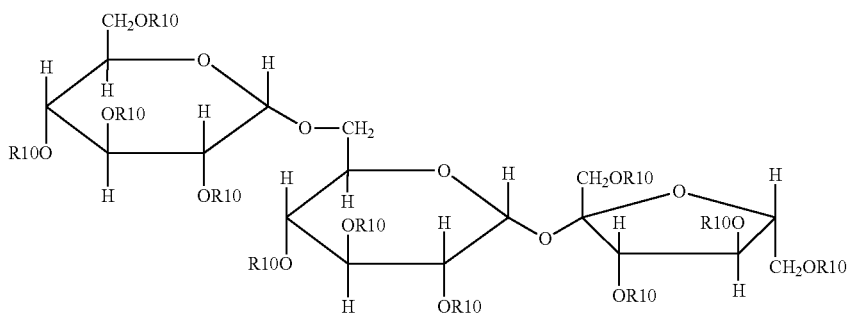 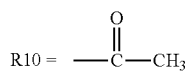
Compound 11
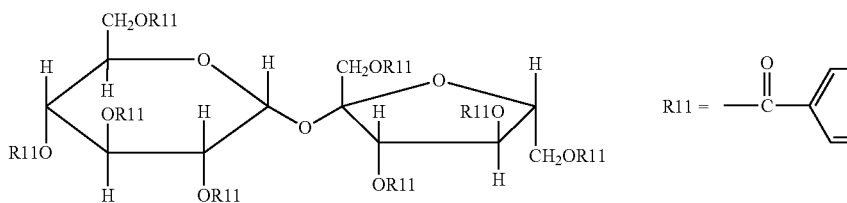 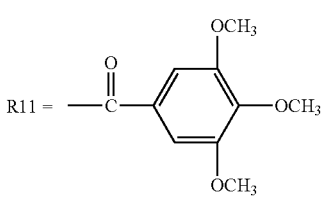

-continued
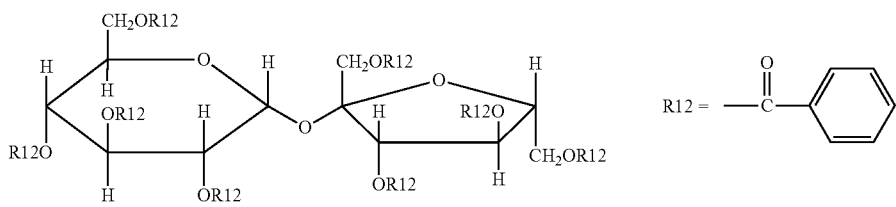
Compound 12
Average substitution degree 8.0
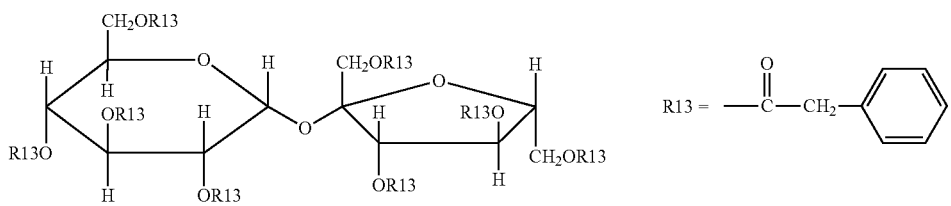
Compound 13
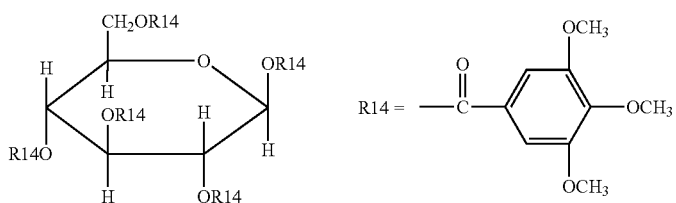
Compound 14
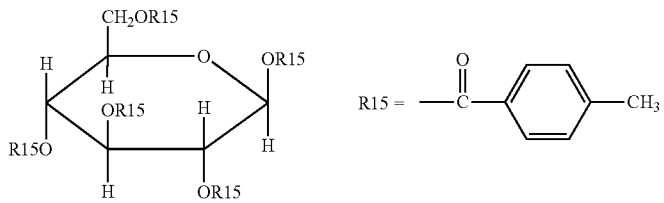
Compound 15
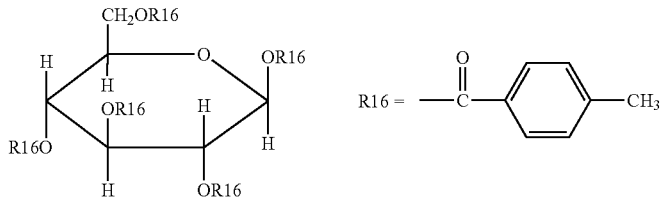
Compound 16
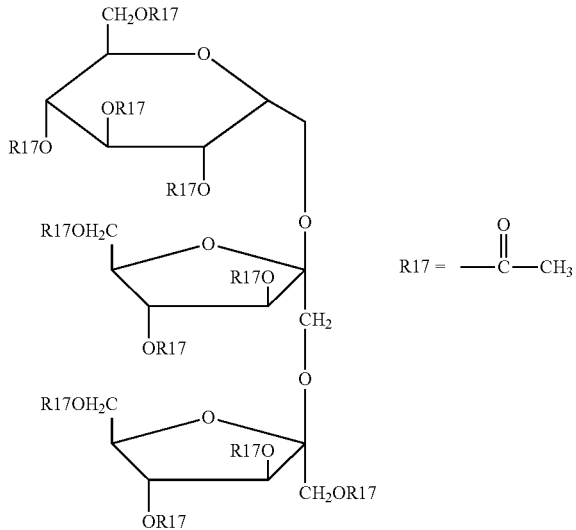
Compound 17

Compound 18
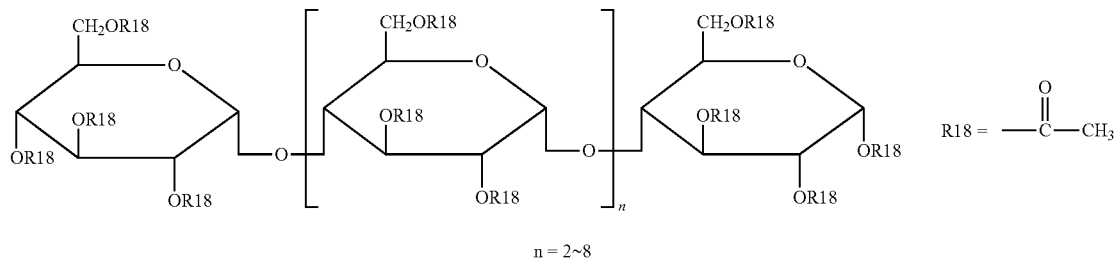
n = 2~8
Compound 19
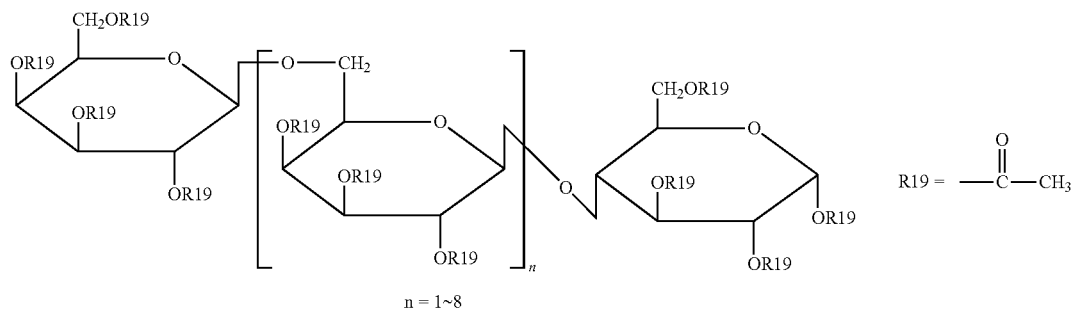
n = 1~8
Compound 20
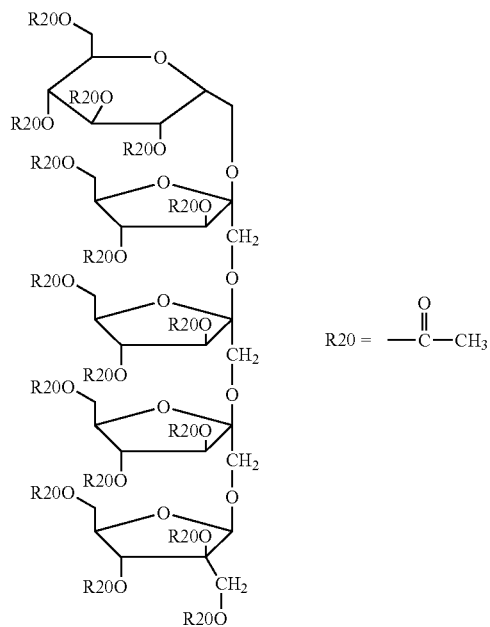
Compound 21
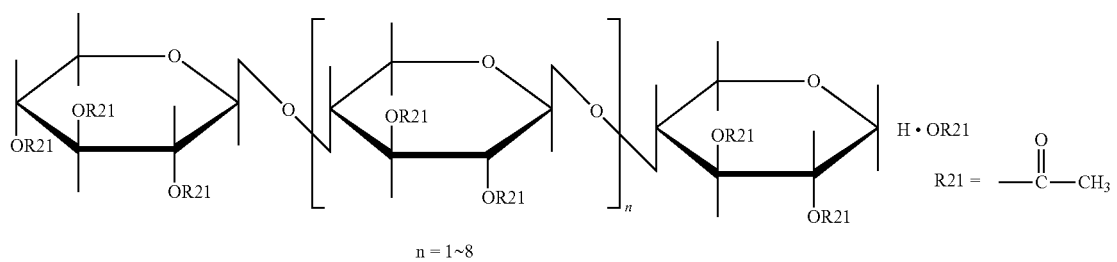
n = 1~8

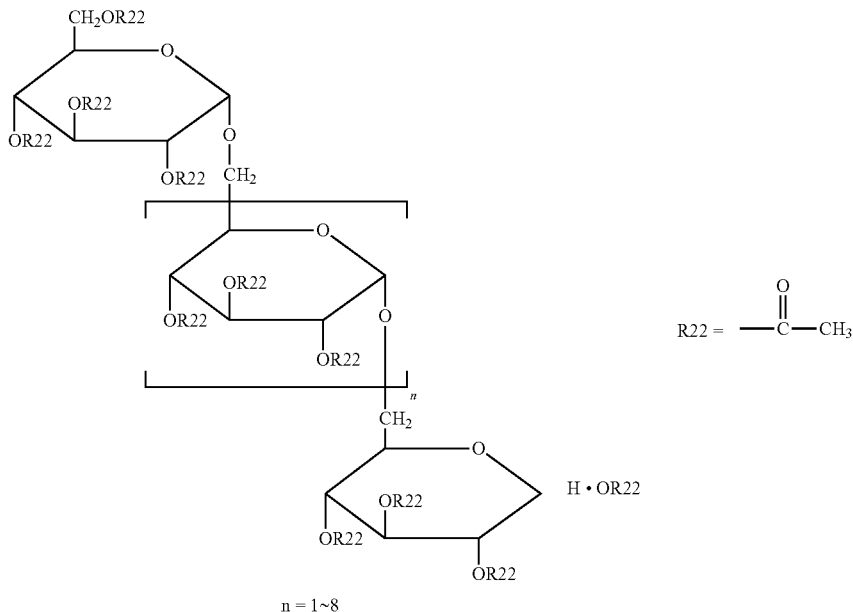

Compound 22

$n = 1\sim 8$

<Polyester D>

Polyester D contains a benzene monocarboxylic acid residue represented by B, an alkylene glycol residue, an oxyalkylene glycol residue or an aryl glycol residue represented by G, and an alkylene dicarboxylic acid residue or an aryl dicarboxylic acid residue represented by A, in Formula (I), and can be obtained via a reaction similar to the usual reaction for a polyester plasticizer.

Examples of an arylcarboxylic acid component of polyester D used in the present invention include: benzoic acid, p-tert-butylbenzoic acid, o-toluic acid, m-toluic acid, p-toluic acid, dimethyl benzoic acid, ethyl benzoic acid, n-propyl benzoic acid, amino benzoic acid and acetoxy benzoic acid. These acids can be employed solely or in combination of two or more kinds.

Examples of an alkylene glycol component having 2-12 carbon atoms of polyester D preferably employed in the optical film used in the present invention include ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol, These glycols are employed solely or in combination of two or more kinds thereof.

An alkylene glycol having 2-12 carbon atoms is particularly preferable since compatibility with a cellulose ester is excellent.

Examples of an oxyalkylene glycol component having 4-12 carbon atoms of the above aromatic terminal ester include diethylene glycol, triethylene glycol, tetraethylene glycol, dipropylene glycol and tripropylene glycol. These glycols can be employed singly or in combination of two or more kinds.

Examples of an alkylene dicarboxylic acid component having 4-12 carbon atoms of the aromatic terminal ester include succinic acid, maleic acid, fumaric acid, glutaric acid, adipic acid, azelaic acid, sebacic acid and dodecane dicarboxylic acid. These acids can be employed solely or a mixture of two or more kinds. Examples of an arylenedicarboxylic acid component having 6 to 12 carbon atoms include phthalic acid, terephthalic acid, isophthalic acid, 1,5-naphthalene dicarboxylic acid and 1,4-naphthalene dicarboxylic acid.

Polyester D used in the present invention preferably has a number average molecular weight of 300-1500 and more preferably 400-1000. The acid value thereof is preferably 0.5 mg KOH/g or less, and the hydroxyl group value thereof is preferably 25 mg KOH/g or less, and, more preferably, the acid value is 0.3 mg KOH/g or less and the hydroxyl group value is 15 mg KOH/g or less.

The used amount of a polyester compound is preferably from 1 mass % to 20 mass %, and particularly preferably film 3 mass % to 13 mass % base on the mass of cellulose acetate, in view of improving such as film performance, and workability.

Specific examples of an aromatic terminal ester plasticizer of the structure represented by Formula (c) usable in the present invention will be shown below, however, the present invention is not limited thereto.

(1)
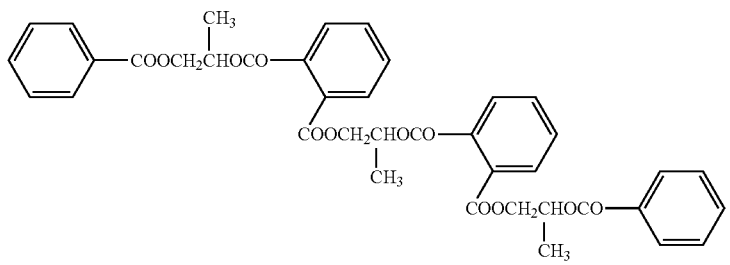
Mw: 696
(2)
Mw: 746
(3)
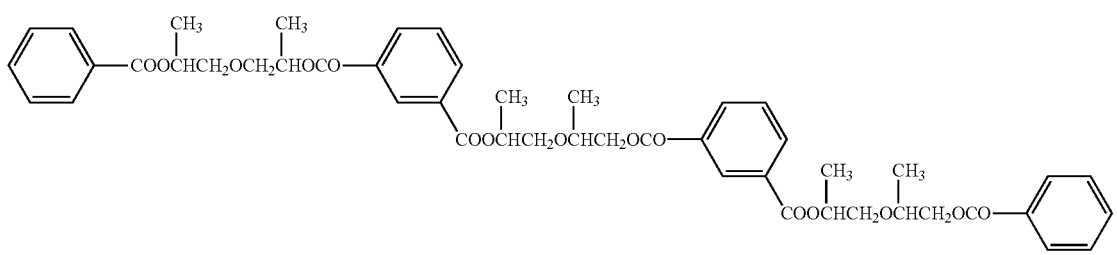
Mw: 830
(4)
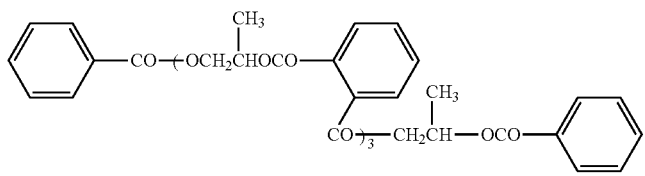
Mw: 886
(5)
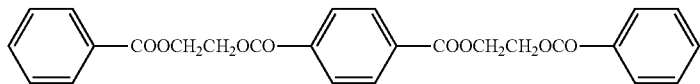
Mw: 462
(6)
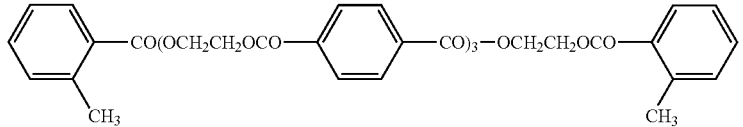
Mw: 874
(7)
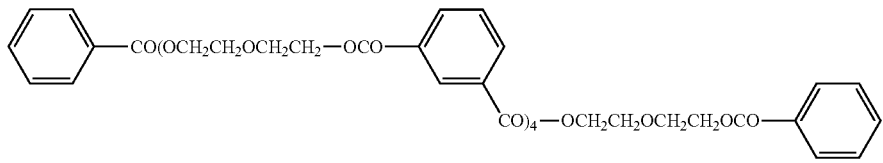
Mw: 1258
(8)
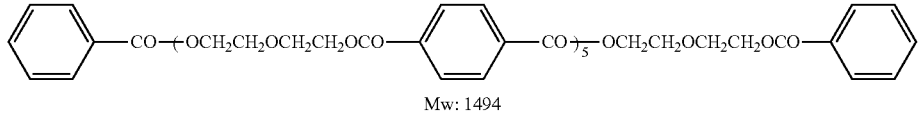
Mw: 1494

(9)
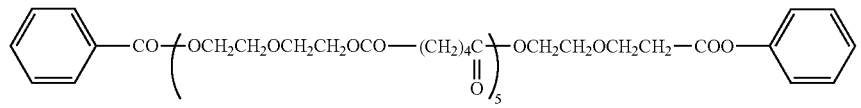
Mw: 1394
(10)
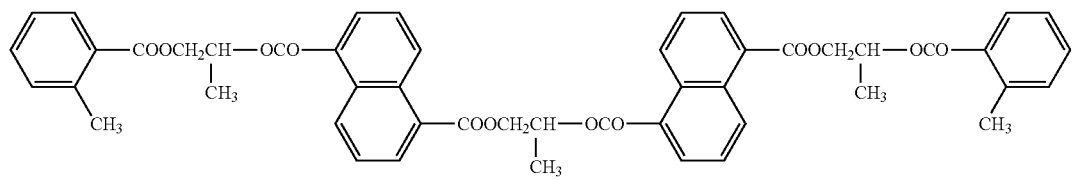
Mw: 852
(11)
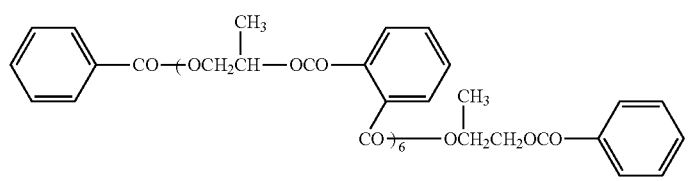
Mw: 1314
(12)
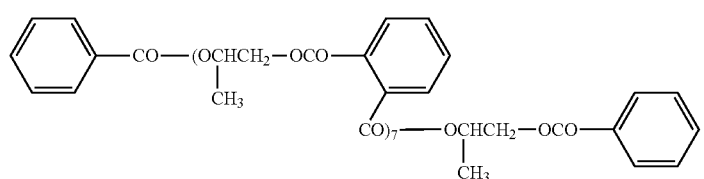
Mw: 1726
(13)
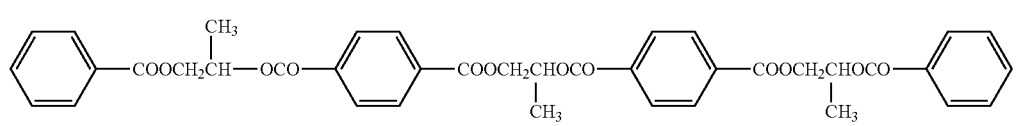
Mw: 696
(14)
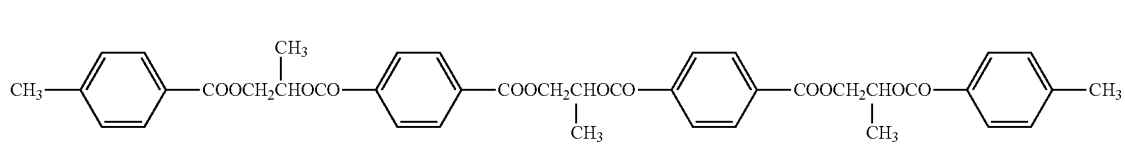
Mw: 724
(15)
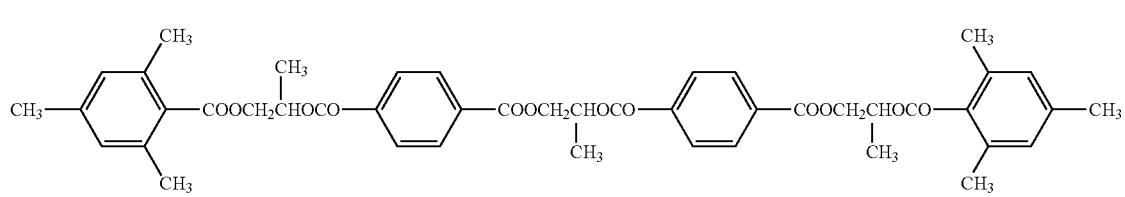
Mw: 780
(16)
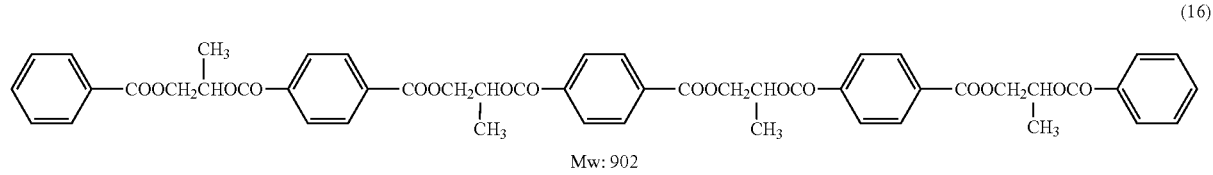
Mw: 902

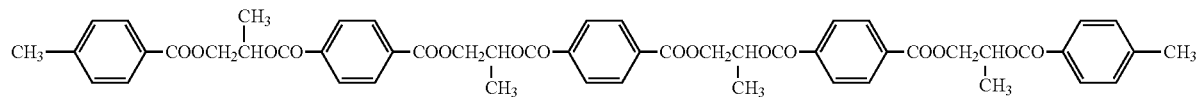
(17)

Mw²: 930

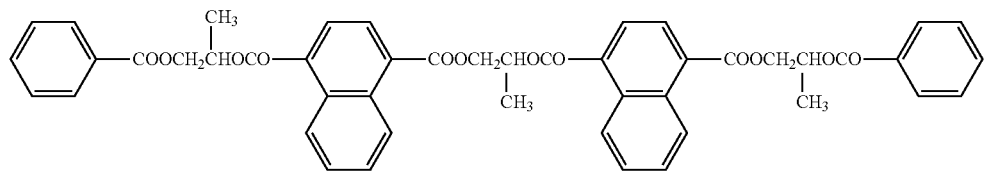
(18)

Mw: 796

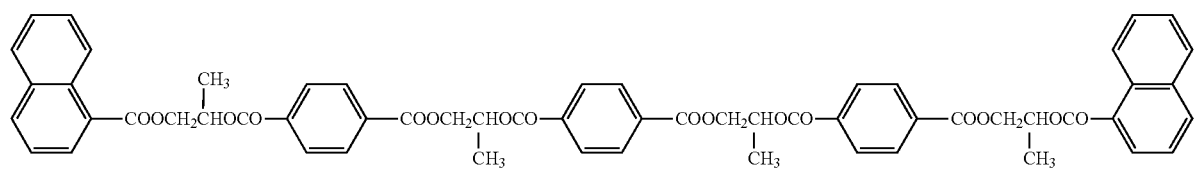
(19)

Mw: 1002

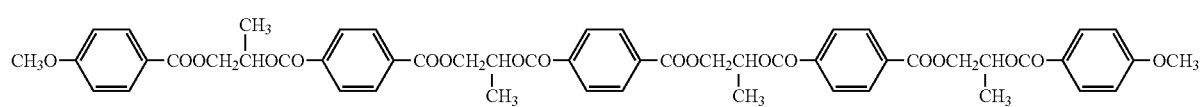
(20)

Mw: 960

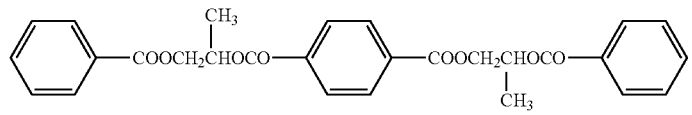
(21)

Mw: 490

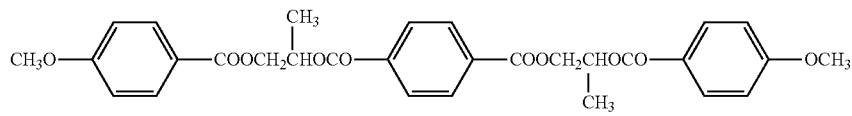
(22)

Mw: 550

<Other Additives>
(Plasticizer)

In the optical film of the present invention, a plasticizer, for example, a phosphoric acid ester based plasticizer, a phthalic acid ester based plasticizer, a trimellitic acid ester based plasticizer, a pyromellitic acid based plasticizer, a glycolate based plasticizer, a citric acid ester based plasticizer, a polyester based plasticizer, or a phosphoric acid ester based plasticizer may be preferably employed.

Examples of other carboxylic acid esters include trimethylolpropane tribenzoate, butyl oleate, methyl acetyl ricinoleate, dibutyl sebacate, and various trimellitic acid esters. Examples of polyester type plasticizers include copolymers of dibasic acids such as an aliphatic dibasic acid, an alicyclic dibasic acid, and an aromatic dibasic acid with glycol.

Although aliphatic dibasic acids are not particularly limited, adipic acid, sebacic acid, phthalic acid, terephthalic acid, and 1,4-cyclohexylcroboxylic acid may be employed. Further, examples of glycols include ethylene glycol, diethylene glycol, 1,3-propylene glycol, 1,2-propylene glycol, 1,4-butylene glycol, 1,3-butylene glycol, and 1,2-butylene glycol.

These dibasic acids and glycols may be employed singly or in combinations of at least two types.

The used amount of these plasticizers is preferably 1 mass % to 20 mass %, and particularly preferably 3 mass % to 13 mass % base on the mass of cellulose ester, in view of such as film performance, workability.

Such a cellulose acetate usually contains a thermal stabilizer, for example, alkali metals (such as lithium, potassium, and sodium), or salts and compounds thereof; or alkali earth metals (such as calcium, magnesium strontiumn and barium) or salts and compounds thereof, in order to improve the thermal stability. The amount of an alkali earth metal such as calcium contained in a common cellulose acetate is around 30 to 200 ppm based on 1 g of cellulose acetate.

The content of a metal salt contained in a cellulose acetate can be determined according to the following method.

<Measurement of Content of Metal Salt (Calcium)>
(Pre-Treatment•Measurement)

About 500 g of a sample is cut and charged into a decomposition tube of a sealable microwave decomposition apparatus, and 8 ml of nitric acid (ultra high purity grade reagent) produced Kanto Chemical Co., Inc. was added to prepare a sample being subjected to wet decomposition. The sample is then transferred to a polypropylene container, and added with ultra pure water to a final amount of 50 ml to be subjected to quantitative analysis of Ca using inductively coupled plasma-atomic emission spectroscopy (ICP-AES).
(Apparatus•Condition)

| | |
|---|---|
| Decomposition apparatus | ETHOS-1 produced by Milestone General K.K. |
| Measuring apparatus | SPS352OUV produced by SII Nano Technology Inc. |
| Measuring wavelength | 393.4769 nm |
| Reagent for calibration curve | Calcium standard liquid for calcium chemical analysis produced by Kanto Chemical Co., Inc. |

(UV Absorbers)

In the optical film of the present invention, a UV absorber is preferably used. Preferably employed UV absorbers may be those which excel in absorption of UV-rays of a wavelength of at most 370 nm, while in view of optimal liquid crystal display performance, preferably employed UV absorbers may be those which result in minimal absorption of visible light of a wavelength of at least 400 nm.

Examples of a UV absorber preferably used in the present invention include oxybenzophenone based compounds, benzotriazole based compounds, salicylic acid ester based compounds, benzophenone based compounds, cyanoacrylate based compounds, and nickel complex salt based compounds, however, the present invention is not limited thereto.

Preferably employed UV absorbers in the present invention include benzotriazole based UV absorbers and benzophenone based UV absorbers, both which exhibit high transparency and exhibit excellent effects to minimize degradation of polarizing plates and liquid crystal elements. Of these, specifically preferred are benzotriazole based UV absorbers which result in minimal unnecessary coloration.

The UV absorber having a distribution coefficient of 9.2 or more disclosed in JP-A No. 2001-187825 enables improving the surface quality of a long length film, and exhibits an excellent coating property. Specifically, it is preferable to use a UV absorber having a distribution coefficient of 10.1 or more.

Further, as a UV absorbing agent, employed may be a polymer UV absorbing agent represented by General Formula (1) or General Formula (2) in JP-A No. 6-148430, or General Formulas (3), (6) or (7) in JP-A No. 2000-156039. For example, PUVA-30M (produced by OTSUKA Chemical Co., Ltd.) is commercially available, as a polymer UV absorbing agent.

It is preferable that particles are added in the optical film of the present invention in order to provide a lubricating property.

The primary average particle size of the particles is preferably 20 nm or less, more preferably 5 to 16 nm, and specifically preferably 5 to 12 nm.

These particles are preferably contained in an optical film with the formation of secondary particles with a particle size of 0.1 to 5 μm, and the average particle size is preferably 0.1 to 2 μm, and more preferably 0.2 to 0.6 μm. By incorporating these particles, an uneven pattern with a height of about 0.1 to 1.0 μm high can be formed on a film surface, whereby a suitable lubricating property can be given to the film surface.

Measurement of the primary average particle size of the fine particles used for the present invention is conducted such that 100 particles are observed with a transmission type electron microscope (magnification of 500,000 to 2,000,000 times) so as to measure the diameter of the particles and to determine the mean value of the measured diameters as a primary average particle diameter.

An apparent specific gravity of the particles is preferably 70 g/liter or more, more preferably 90 to 200 g/liter, and still more preferably 100 to 200 g/liter. When the apparent specific gravity is larger, it may become more possible to make a high-concentration dispersion liquid and it may become preferable that a haze and a coagulum may be improved. Further, in the case where a dope solution having a high solid concentration is prepared such as in the present invention, it is used especially preferably.

Silicon dioxide particles having a mean diameter of primary particles of 20 nm or less and an apparent specific gravity of 70 g/liter or more can be obtained such that, for example, a mixture of vaporized silicon tetrachloride and hydrogen is burn in air at 1000 to 1200° C. Further, for example, silicon dioxide particles are commercially available with the trade name of Aerosil 200V and Aerosil R972V (all the above, produced by Japanese Aerosil Corporation), and they can be employed in the present invention.

The apparent specific gravity of the above-mentioned description can be calculated with the following ways, a predetermined quantity of silicon dioxide particles is taken in a measuring cylinder, the weight of them is measured at this time, and the apparent specific gravity is calculated with the following formula.

<Method of Producing Optical Film>

Next, description will be given with regard to method of producing the optical film of the present invention.

Even if the optical films of the present invention are films produced by melt casting method or films produced by solution casting method, these films can be used preferably.

The manufacture of the optical film of the present invention is conducted by a process of dissolving cellulose ester and additives in a solvent so as to prepare a dope; a process of casting the dope on an endless metal support member which shifts endlessly, a process of drying the cast dope as a web, a process of peeling the web from the metal support member, a process of stretching or holding the width, a process of drying the web further, and a process of winding up the finished film.

A process of preparing a dope is further stated, that is, a higher content or concentration of cellulose resin in the dope is preferable since the load of the drying process following the flow-casting process on a metal support is reduced, however, if the concentration of cellulose resin is too high, the load of the filtration becomes larger and filtration accuracy becomes worse. Preferable content of cellulose resin to satisfy the both is from 10 to 35 percent by mass and more preferably from 15 to 25 percent.

A solvent used in the dope of the present invention may be used alone, however, two or more solvents may also be used together. A mixture of a good solvent for cellulose resin and a poor solvent is more preferably used to increase manufacturing efficiency. A mixed solvent being rich in a good solvent is preferable to increase solubility of the cellulose resin.

The preferable mixing ratio is from 70 to 98 percent by mass of a good solvent, and from 2 to 30 percent by mass of a poor solvent. Herein, the good solvent is defined as being capable of dissolving cellulose resin with a single use, and a poor solvent as swelling or being incapable of dissolving cellulose ester with a single use.

Sometimes, a solvent works as a good solvent of a cellulose ester, and sometimes as a poor solvent depending on the acetification degree (degree of acetyl substitution) of the cellulose ester. For example, acetone becomes a good solvent for an acetic ester of a cellulose resin of which the acetification degree is 2.4, as well as for a cellulose acetatepropionate, however, it becomes a poor solvent for an acetic ester of cellulose of which the acetification degree is 2.9.

Good solvents used in the present invention include, for example: organic halides (such as methylene chloride), dioxolanes, acetone, methyl acetate and methyl acetoacetate. Specifically preferably, methylene chloride and methyl acetate may be cited.

Poor solvents used in the present invention include, for example: methanol, ethanol, n-butanol, cyclohexane and cyclohexanone, however, the present invention is not specifically limited thereto. A dope may preferably contain from 0.01 to 2 percent by mass of water.

Further, as a solvent utilized for dissolution of cellulose ester, a solvent removed from film by drying in a film casting process is recovered and reused.

In a recovered solvent, a trace amount of additives such as a plasticizer, an ultraviolet absorbent, polymer or monomer components may be contained, however, the solvent may be utilized even containing them or may be utilized appropriately after purification.

In the process of preparing an aforementioned dope, a cellulose ester is dissolved in a mixture of solvents using a common method. Dissolving a cellulose ester at a higher temperature is possible when the heating is carried out under a higher pressure.

Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure.

The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high.

The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter.

The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®)) as well as metal(alloy) filters (such as stainless steel) are preferable, since these materials are free from peeling of a fiber, which may occur when fibrous material is used.

Impurities and, particularly, luminescent foreign materials contained in the cellulose ester are preferably diminished or entirely removed by filtering.

"Luminescent foreign materials" denote impurities which are observed as bright spots when an optical film is placed between two polarizing plates arranged in a crossed Nicol state, illuminated with a light from one side and observed from the other. The number of luminescent foreign materials of larger than 0.01 mm in diameter is preferably 200 per $cm^2$ or less.

More preferably it is 100 per $cm^2$ or less and still more preferably it is 50 per $cm^2$ or less, and further more preferably it is from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering (also referred to as a differential pressure) is reduced.

The filtering temperature is preferably from 45 to 120° C., more preferably from 45 to 70° C. and still more preferably from 45 to 55° C.

The pressure applied during filtering is preferably low, being preferably not larger than 1.6 MPa, more preferably not large than 1.2 MPa and still more preferably not large than 1.0 MPa.

Casting of a dope will now be explained.

A metal support polished to a mirror finished surface is used in the flow-casting process. A polished stainless steel belt or a plated cast drum is used as a metal support.

The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web.

The temperature of the support depends on the solvent, however, is preferably in the range of 0 to 60° C., and more preferably in the range of 25 to 55° C. Another preferable method is that a web is gelated by cooling the drum followed by peeling the web from the drum while the web still contains much solvent.

The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, an air temperature higher than the desired temperature is sometimes used.

In order to obtain a cellulose ester film with a sufficient flatness, the residual solvent content of the web when it is peeled from a metal support is preferably 10-150% by mass, however, it is more preferably 20-40% by mass or 60-130% by mass. The residual solvent content is specifically more preferably 20-30% by mass or 70-120% by mass.

The residual solvent content of the web is defined by the following formula:

Residual solvent content (% by mass)=$\{(M-N)/N\} \times 100$ where M represents the mass of a sample of the web collected in the manufacturing process or after manufacturing, and N represents the mass of the same sample after it was dried at 115° C. for 1 hour.

In the drying process of a cellulose ester film, the film is peeled from the support and further dried until the residual solvent decreases below not more than 1 mass %, more preferably not more than 0.1 mass %, specifically preferably 0-0.01 mass %.

In the film drying process, usually a roll drying method in which a cellulose ester film is passed through many rollers placed alternatively up and down in a staggered manner or a drying process to dry while conveying a film with a tenter method may be employed.

In order to produce the cellulose ester film of the present invention, the stretching of a web in the width direction (transverse direction) with a tenter technique which grips the both ends of the web with a clip etc. is specifically desirable. The web is preferably peeled with a tension of 300 N/m or less.

The method to dry the web is not specifically limited, however, generally, hot air, IR ray, heated rollers or microwave irradiation is used. Hot air is preferably used with respect to ease of cure and low cost.

The preferable drying temperature of a web is from 40 to 200° C. and is preferably increased stepwise.

The optical film relating to the present invention has preferably a width of from 1 to 4 m, more preferably a width of from 1.3 to 4 in, and specifically preferably a width of from 1.3 to 3 m.

The target retardation values Ro and Rth of the optical film of the present invention may be controlled by adjusting the amounts of sugar ester C and polyester D, and the stretching ratio in the film manufacturing process (namely, by controlling tenter stretching and conveying tension).

For example, it is possible to perform successive or simultaneous biaxial or uniaxial stretching in the longitudinal direction of film (the cast direction) and in the direction perpendicular thereto, that is, in the width direction.

The stretching ratios in the biaxial directions perpendicular to each other are preferably set to finally 0.8 to 1.5 times in the cast direction and 1.1 to 2.5 times in the width direction, and more preferably set to 0.8 to 1.0 times in the cast direction and 1.3 to 1.5 times in the width direction.

The stretching temperature is preferably 120° C. to 200° C., more preferably 140° C. to 200° C., still more preferably higher than 140° C. and not higher than 180° C.

It may be preferable to stretch a film under the condition where the content of the residual solvent in the film is 20 to 0%, more preferably 15 to 5%.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edge of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of cause, these methods can be utilized in combination.

In a so-called tenter method, it is preferable that a smooth stretching can be performed by driving the clip portion by a linear chive method which reduces risk to such as break.

It is preferable to perform the width holding or stretching in the width direction by a tenter, which may be either a pin tenter or a clip tenter.

The slow axis or the fast axis of optical compensation film of this invention preferably is present in a film plane and θ1 is preferably not less than −1 and not more than +10, and more preferably not less than −0.3° and not more than +0.3°, when the angle against the casting direction is θ1.

This θ1 can be defined as an orientation angle, and measurement of θ1 can be performed by use of automatic double refractometer KOBRA-21ADH (Oji Scientific Instruments) under the condition of 23° C. and 55% RH. To satisfy the above-described relationships by 81 can contributes to obtain a high luminance and to restrain or prevent light leak, and to obtain faithful color reproduction in a color liquid display <Physical Properties of the Optical Film>

The moisture permeability of the optical film relating to the present invention is preferably 800 to 1600 g/m²·24 h, more preferably 1000 to 1600 g/m²·24 h and specifically preferably 1200 to 1600 g/m²·24 h at 40° C., 90% RH. The moisture permeability can be measured according to a method described in JIS Z 0208.

The elongation percentage of the optical film relating to the present invention is preferably 10 to 80% and more preferably 20 to 50%.

The visible light transmittance of the optical film relating to the present invention is preferably not less than 90% and more preferably not less than 93%.

The haze of the optical film relating to the present invention is preferably less than 1% and specifically preferably 0 to 0.2%.

The internal haze of the optical film relating to the present invention is preferably less than 0.1% and specifically preferably 0 to 0.05%.

In the optical film relating to the present invention, it is desirable that difference in refractive index between its one surface and its opposite surface (also referred to as a front surface and reverse surface) is in a range of $5 \times 10^{-4}$ or more and $5 \times 10^{-3}$ or less.

The reason why is as follows. If a polarizing plate is made thin, the stiffness of the polarizing plate becomes weak. Accordingly, when the polarizing plate is pasted on a liquid crystal cell, generation of air bubbles and positional deviation tend to occur. Therefore, curl intentionally given to the second cellulose ester film enhances the stiffness of the polarizing plate, whereby the above problems at the time of pasting of the polarizing plate onto the liquid crystal cell can be reduced.

<Functional Layers>

In a hard coat film, an antistatic layer, a back coat layer, an antireflection layer, a lubricant layer, an adhesing layer, an anti-glare layer or a barrier layer may be provided.

<Back Coat Layer>

On a hard coat film, a back coat layer may be provided on the surface of a substrate film opposite to the surface on which a hard coat layer is formed, in order to prevent curl or sticking.

Examples of particles added in the back coat layer include, as examples of inorganic compounds, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. The amount of the particles contained in the back coat layer is preferably from 0.1 to 50% by mass based on the mass of the binder. The increase in haze when a back coat layer is formed is preferably 1.5% or less, more preferably 0.5% or less, and still more preferably 0.1% or less. As a binder, a cellulose acetate resin such as diacetyl cellulose is preferably used.

<Antireflection Layer>

A hard coat film may be used as an antireflection film having a function to prevent the reflection of outside light by applying an antireflection layer as an upper layer on the hard coat layer. The antireflection layer is preferably laminated in consideration of such as a refractive index, a layer thickness, a number of layers and an order of layers so as to reduce reflectivity by optical interference. An antireflection layer is preferably constituted of a low refractive index layer having a lower refractive index than the refractive index of the substrate or a combination of a high refractive index layer having a higher refractive index than the refractive index of the substrate and a low refractive index layer. The antireflection layer is specifically preferably an antireflection layer constituted of not less than 3 refractive index layers and preferably contains 3 layers having different refractive indexes accumulated in the order of a medium refractive index layer (a layer having a refractive index higher than that of the hard coat layer or the substrate but lower than the refractive index of the high refractive index layer)/a high refractive index layer/a low refractive index layer, from the substrate side. Also, an antireflection layer having a layer construction of 4 layers or more in which 2 or more high refractive index layers and 2 or more low refractive index layers are alternately laminated.

Examples of a preferable layer constitution include the following construction, however, the present invention is not limited thereto.

Substrate film/hard coat layer/low refractive index layer

Substrate film/hard coat layer/medium refractive index layer/low refractive index layer Substrate film/hard coat layer/medium refractive index layer/high refractive index layer/low refractive index layer Substrate film/hard coat layer/high refractive index layer (electrically conductive layer)/low refractive index layer Substrate film/hard coat layer/anti-glare layer/low refractive index layer The low refractive index layer which is essential in an antireflection layer preferably contains silica particles of which refractive index is lower than the refractive index of substrate film which is the support, and is preferably in the range of 1.30 to 1.45 when measured at a wavelength of 550 nm and at 23° C.

The thickness of the low refractive index layer is preferably from 5 nm to 0.5 µm, more preferably from 10 nm to 0.3 µm, and most preferably from 30 nm to 0.2 µm. With respect to the low refractive index layer forming composition, it is preferable that at least one kind of particles each have a shell layer and porous or vacant inside. Specifically, it is preferable that the particles each have a shell layer and porous or vacant inside are hollow silica particles.

It is also preferable that the low refractive index layer forming composition further contains an organo-silicon compound represented by following Formula (OSi-1), or hydrolyzed substance or polycondensation product thereof.

 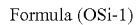

$$Si(OR)_4 \quad \text{Formula (OSi-1)}$$

In the organo-silicon compound represented by the above formula, R represents an alkyl group having 1 to 4 carbon atoms. More concretely, for example, tetramethoxy silane, tetraethoxy silane, tetraisopropoxy silane are preferably used. Further, a silane coupling agent, a hardener, or a surfactant may be added, if necessary.

<Polarizing Plate>

The polarizing plate employing the optical film of the present invention will be described. The polarizing plate can be produced by a common method. It is preferable that rear side of the hard coat film of the present invention is subjected to alkali saponification treatment, treated the hard coat film is laminated on at least one side of a polarizer produced by immersing in iodine solution and stretching, using complete saponified type polyvinylalcohol aqueous solution.

On the other side, the hard coat film or another polarizing plate protecting film may be employed.

Examples of a preferably used commercially available polarizing plate protective film include KC4UA, KC6UA, KC8UX2MW, KC4UX, KC5UX, KC4UY, KC8UY, KC12UR, KC4UEW, KC8UCR-3, KC8UCR-4, KC8UCR-5, KC4FR-1, KC4FR-2, KC8UE and KC4UE (all produced by Konica Minolta Opto, Inc.)

A polarizer, which is a main component of the polarizing plate, is an element which transmits polarized light in only predetermined direction. A currently known representative polarizing film is a polyvinyl alcohol polarizer. Two types of polyvinyl alcohol polarizing films are known, namely, one is stained with iodine and the other is stained with a dichroic dye, but is not limited to these.

A polarizing film is prepared in such a manner that an aqueous polyvinyl alcohol solution is cast to form a film and then the film is monoaxially stretched, followed by dying, or the film is stained with a dye first and then monoaxially stretched, followed by carrying out a durability enhancing treatment employing a boron compound. The thickness of the polarizing is from 5 to 30 µm, and preferably from 10 to 25 µm. The hard coat film of the present invention is adhered on the surface of the polarizer to form a polarizing plate. It is preferable to carry out the above adhesion employing an aqueous adhesive containing a completely saponified polyvinyl alcohol as the main component.

<Adhesive Layer>

The adhesive layer which is provided on one surface of a protective film and used to be adhered with the substrate of a liquid crystal cell preferably exhibits a moderate viscoelasticity and adhesive property.

Using adhesives, for example, an acrylic copolymer, an epoxy resin, a polyurethane, a silicone polymer, a polyether, a butyral resin, a polyamide resin, a polyvinyl alcohol resin or a synthetic rubber, the adhesive layer may be specifically cured via such as a drying method, a chemical curing method, a thermally curing method, a thermally melting method, or a photocuring method. Of these, an acrylic copolymer may be preferably used since its adhesive property is easiest to control, as well as it is excellent in transparency, environment resistance and durability.

<Liquid Crystal Display Device>

By installing the polarizing plate of the present invention produced by employing an optical film of the present invention in a display device, varieties of image display devices excellent in visibility can be produced.

By being installed in a polarizing plate, the optical film of the present invention can be preferably used in liquid crystal display devices of such as reflective type, transmission type, half-transmission type, or of various modes such as TN mode, STN mode, OCB mode, HAN mode, VA mode (including PVA mode and MVA mode), IPS mode and OCB mode.

EXAMPLES

The present invention will be specifically explained with referring to example, however, the present invention is not limited thereto. In the following examples, "%" or "parts" represents "mass %" or "mass parts", respectively, unless otherwise specifically noted.

Synthesis of Cellulose Acetate

Synthesis Example 1

A kraft-based dissolving pulp (α-cellulose content of 93%) was cracked in water, and dried via acetone substitution. For 100 mass parts of this pulp, 500 mass parts of acetic acid was uniformly sprayed, and mixed at 40° C. for 30 minutes to activate in a pre-treatment.

On the other hand, a mixture of 250 mass parts of acetic acid anhydride, and 4.0 mass parts of sulfuric acid was added for esterification according to a common method. The content produced heat according to a reaction of water contained in the raw material pulp with the acetic acid anhydride and a reaction of the cellulose with the acetic acid anhydride. The heat was controlled by cooling from outside. Subsequently, 125 mass parts of an organic solvent was added, and the acetylation reaction was further conducted while keeping warm.

Next, the organic solvent which was a reaction liquid was removed by heat, 35 mass parts of 20% aqueous solution of calcium acetate was added to mix, and the sulfuric acid in the system was completely neutralized while keeping excess calcium acetate.

After storing the reacted mixture, which had been completely neutralized, at 150° C. for 50 minutes, the reacted mixture was cooled to 100° C. under an ambient atmosphere. The reacted mixture was added with a diluted acetic acid aqueous solution while being stirred, separated as flake-like cellulose acetate, thoroughly washed, taken out and then dried. The obtained flake-like cellulose acetate B exhibited an acetyl group substitution degree of 2.4.

Synthesis Example 2

A cotton linter was cracked in water, and dried via acetone substitution. For 100 mass parts of this linter, 500 mass parts of acetic acid was uniformly sprayed, and mixed at 40° C. for 30 minutes to activate in a pre-treatment. On the other hand, a mixture of 250 mass parts of acetic acid anhydride, 375 mass parts of acetic acid, and 3.0 mass parts of sulfuric acid was added for esterification according to a common method.

The content produced heat according to a reaction of water contained in the raw material linter with the acetic acid anhydride and a reaction of the cellulose with the acetic acid anhydride. The heat was controlled by cooling from outside. Subsequently, 125 mass parts of an organic solvent was added, and the acetylation reaction was further conducted while keeping warm.

Next, the organic solvent which was a reaction liquid was removed by heat, 32 mass parts of 20% aqueous solution of calcium acetate was added to mix, and the sulfuric acid in the system was completely neutralized while keeping excess calcium acetate.

After storing the reacted mixture, which had been completely neutralized, at 150° C. for 50 minutes, the reacted mixture was cooled to 100° C. under an ambient atmosphere. The reacted mixture was added with a diluted acetic acid aqueous solution while being stirred, separated as flake-like cellulose acetate, thoroughly washed, taken out and then dried. The obtained flake-like cellulose acetate C exhibited an acetyl group substitution degree of around 2.4.

Synthesis Example 3

Cellulose acetates were prepared similarly to synthesis example 1 by adjusting the amount of catalyst of kraft-based dissolving pulp reaction, or the amount of calcium acetate. Obtained cellulose acetates were named as A, D, F, H, and J to P. The 6% viscosities and acetyl substitution degrees were shown in Table 1.

Synthesis Example 4

Cellulose acetates were prepared similarly to synthesis example 2 by adjusting the amount of catalyst of cotton linter reaction, or the amount of calcium acetate. Obtained cellulose acetates were named as G, I and Q. The 6% viscosities and acetyl substitution degrees were shown in Table 1.

TABLE 1

| Cellulose acetate | 6% viscosity mPa·s | Acetyl group substitution degree | Raw material |
|---|---|---|---|
| A | 200 | 2.1 | Wooden pulp |
| B | 105 | 2.4 | Wooden pulp |
| C | 100 | 2.4 | Linter |
| D | 50 | 2.4 | Wooden pulp |
| E | 50 | 2.4 | Linter |
| F | 40 | 2.4 | Wooden pulp |
| G | 40 | 2.4 | Linter |
| H | 110 | 2.4 | Wooden pulp |
| I | 110 | 2.4 | Linter |
| J | 95 | 2.4 | Wooden pulp |
| K | 70 | 2.4 | Wooden pulp |
| L | 25 | 2.4 | Wooden pulp |
| M | 90 | 2.4 | Wooden pulp |
| N | 200 | 2.6 | Wooden pulp |
| O | 40 | 1.8 | Wooden pulp |
| P | 200 | 2.7 | Wooden pulp |
| Q | 220 | 2.9 | Linter |

Example 1

<Production of Hard Coat Film 1>
(Silicon Dioxide Dispersion Liquid)

| | |
|---|---|
| Aerosil R812 (manufactured by Japan Aerosil Co., Ltd.) (average particle size of primary particles: 12 nm, apparent specific gravity: 90 g/litter) | 12 parts by mass |
| Ethanol | 88 parts by mass |

The substances listed above were agitated and mixed by a dissolver for 30 minutes and then dispersed by the use of Manton Gaulin. Into the silicon dioxide dispersion liquid, 88 parts by mass of methylene chloride was added while stirring, and the resulting mixture was stinted and mixed for 30 minutes by the dissolver, whereby silicon dioxide dispersion diluent was prepared.
(Preparation of in-Line Additive Liquid)

| | |
|---|---|
| TINUVIN 109 (Manufactured by Chiba Specialty Chemicals) | 11 parts by mass |
| TINUVIN 171 (Manufactured by Chiba Specialty Chemicals) | 5 parts by mass |
| Methylene chloride | 100 parts by mass |

The substances above were charged into a sealed container and heated while being stirred so as to completely dissolve and then filtered.

Into the resultant liquid, 36 parts by mass of the silicon dioxide dispersion diluent was added while stirring, and after stirring for a further 30 minutes, 6 parts by mass of the following cellulose triacetate was added while stirring, and after stirring for further 60 minutes, the resultant liquid was filtered with a polypropylene wind cartridge filter TCW-PPS-IN of Advantech Toyo Company, whereby inline additive liquid was prepared.

(Preparation of Dope Solution)

| | |
|---|---|
| Cellulose triacetate KTL acetylation degree 60.9 (produced by Daicel orporation.) | 100 parts by mass |
| Trimethylolpropan tribenzoate (TMPTB) | 5.0 parts by mass |
| Ethyl phthalyl ethyl glycolate (EPEG) | 5.5 parts by mass |
| Methylene chloride | 440 parts by mass |
| Ethanol | 40 parts by mass |

The substances above were charged into a sealed container and completely dissolved by being heated and stained, and then filtered using Azumi filter paper No. 24 manufactured by Azumi Filter Paper Co., Ltd., whereby dope solution was prepared.

The dope solution was filtered by use of Fine Met NF manufactured by Nippon Seisen Co., Ltd in a film manufacturing line. The inline additive liquid was filtered by the Fine Met NF manufactured by Nippon Seisen Co., Ltd in the in-line additive liquid line. Two parts by mass of the filtered inline additive liquid was added to 100 parts by mass of the filtered dope solution, and then was sufficiently mixed with an inline mixer (Toray static in-tube mixer Hi-Mixer SWJ). Subsequently, by use of a belt casting device, the resultant solution was evenly cast on a stainless steel band support with a width of 1.8 m at a temperature of 35° C.

The solvent was evaporated on the stain less steel band support until the remaining solvent amount became 120%, and then the cast film was peeled from the stainless steel band support. The peeled cellulose ester web was heated to 35° C. so as to evaporate the solvent, was slit so as to have a width of 1.65 m, and thereafter was dried with a drying temperature of 135° C. while being stretched to 1.05 times in the TD direction (the direction perpendicular to the conveyance direction of the film) by a tenter. The remaining solvent amount at the time of start of stretching with the tenter was 30%.

Thereafter, the film was dried while being conveyed with many rollers in the drying zones of 110° C. and 120° C., was slit so as to have a width of 1.5 nm, and was subjected to a knurling process applied to both edges of the film with a width of 15 mm and a height of 10 μm, whereby a cellulose triacetate film with an average thickness of 60 μm to be used for Hard coat film 1 was produced.

As a result of measurement of the retardation value, Ro and Rth were 3 nm and 50 nm respectively.

On Cellulose triacetate film 1 prepared as described above, the following UV curable resin composition 1 which had been filtered through a filter made of polypropylene having a pore size of 0.4 μm was coated by use of a microgravure coater. After drying the obtained film at 80° C., the applied layer was cured using a UV lamp at a lighting intensity on an irradiation portion of 80 mW/cm$^2$ and an irradiance quantity of 80 mJ/cm$^2$ to form Hard coat layer 1 of which dry thickness was 9 μm, followed by being wound, whereby Hard coat film 1 of a roll shape was prepared.

On KC6UA (produced by KONICA MINOLTA) as a polarizing plate protective film, the following UV curable resin composition 1 which had been filtered through a filter made of polypropylene having a pore size of 0.4 μm was coated by use of a microgravure coater. After drying the obtained film at 80° C., the applied layer was cured using a UV lamp at a lighting intensity on an irradiation portion of 80 mW/cm$^2$ and an irradiance quantity of 80 mJ/cm$^2$ to form Hard coat layer 1 of which dry thickness was 9 μm, followed by being wound, whereby Hard coat film 2 of a roll shape was prepared.

<Hard Coat Layer Coating Composition 1>

The following materials were stirred and mixed to obtain Hard coat layer coating composition 1.

| | |
|---|---|
| Thermoplastic resin, polyurethane resin (commercial name VYLON UR1350 produced by TOYOBO Co., Ltd., solid content 33% (solvent of toluene/methyethyl ketone = 65/35)) | 6.0 mass parts (containing 2.0 mass parts of a polyester urethane resin) |
| Pentaerythritol triacrylate | 30 mass parts |
| Pentaerythritol teteraacrylate | 30 mass parts |
| Irgacure 184 (photoinitiator, produced by Ciba Japan K. K.) | 3.0 mass parts |
| Irgacure 907 (photoinitiator, produced by Ciba Japan K. K.) | 1.0 mass parts |
| Polyether modified polydimethyl siloxane (BYK-UV3510, produced by BIC CHMIE JAPAN Co., Ltd.) | 2.0 mass parts |
| Propylene glycol monomethyether | 150 mass parts |
| Methyl ethyl letone | 150 mass parts |

<Preparation of Optical Film 101>

The optical films were prepared as described below.

<Particulate Dispersion Liquid>

| | |
|---|---|
| Particulate (Aerosil R812 manufactured by Japan Aerosil Co., Ltd.) (average particle size of primary particles: 16 nm, apparent specific gravity: 90 g/litter) | 11 parts by mass |
| Ethanol | 89 parts by mass |

The substances listed above were agitated and mixed by a dissolver for 50 minutes and then dispersed by the use of Manton Gaulin.

<Particulate Additive Liquid>

Cellulose ester B was added into a solution tank storing methylene chloride, and heated and dissolved completely. Thereafter the resultant solution was filtered by the use of Azuni filter paper No. 244 manufactured by Azumi Filter Paper Co., Ltd. While the filtered cellulose ester solution was fully being agitated, particulate dispersion liquid was added slowly into the solution. Furthermore, the solution was dispersed by an attritor so that the particle size of secondary particles became a predetermined size. The resultant solution was filtered by the use of Fine Met NF manufactured by Nippon Seisen Co., Ltd., whereby Particulate additive liquid was prepared.

| | |
|---|---|
| Methylene chloride | 99 parts by mass |
| Cellulose acetate B | 4 parts by mass |
| Particulate dispersion liquid 1 | 11 parts by mass |

A main dope liquid of the following composition was prepared. First, methylene chloride and ethanol were added to a pressure solution tank. Cellulose esters (α and β) were supplied into the pressure solution tank storing the solvents while being agitated. Further, it was dissolved completely while being heated and agitated. Sugar ester C and Polyester D were further added and dissolved.

The resultant liquid was filtered by the use of Azumi filter paper No. 244 manufactured by Azumi Filter Paper Co., Ltd., whereby the main dope liquid was prepared.

Into 100 parts by mass of the main dope solution, 5 parts by mass of the particulate additive liquid was added, and then sufficiently mixed by an inline mixer (Toray static in-line mixer Hi-Mixer SWJ). Then, by the use of a belt casting device, the resultant mixture solution was evenly cast with a width of 2.0 m on a stainless steel band support.

The solvent was evaporated on the stainless steel band support until the residual solvent amount became 110%, and then the cast film was peeled from the stainless steel band support. At the time of peeling, the web (peeled film) was stretched with tension such that a longitudinal stretching ratio (MD) became 1.1 times. Subsequently, the web was further stretched by a tenter grasping the both ends of the web such that a stretching ratio in the width (TD) direction became 1.3 times. After the stretching, the web was held for several seconds while the width of the web was maintained with tension, then the tension in the width direction was relaxed, and successively, the maintaining of the width was released. Subsequently, the web was dried by being conveyed in a third drying zone set as 125° C. for 30 minutes, whereby Optical film 101 which had a width of 1.5 m, a thickness of 50 μm, and embosses at both ends with a width of 1 cm and a height of 8 μm was produced. In Optical film 101, the mass ratio of Cellulose acetates B and D was (Cellulose acetate B):(Cellulose acetate D)=50:50.

<Composition of Main Dope Liquid>

| | |
|---|---|
| Methylene chloride | 390 parts by mass |
| Ethanol | 80 parts by mass |
| Cellulose acetate α (Cellulose acetate B) | 50 parts by mass |
| Cellulose acetate β (Cellulose acetate D) | 50 parts by mass |
| Sugar ester compound C (Conpound 4) | 10 parts by mass |
| Polyester D (21) | 2.5 parts by mass |

Optical films 102 to 131 were prepared in the same manner as described above, except that the composition of dope liquid (cellulose acetate), Sugar ester C, and Polyester D were changed as shown in Table 2.

In Table 2, TPP represents triphenyl phosphate, and TNBC represents tri-n-butyl citrate.

Resulting Optical films 101 to 131 were subjected to measurements of an in-plane retardation value Ro, a thickness direction retardation value Rth, an internal haze, an internal scattering and a moisture permeability. The results were shown in Table 2.

<Measurement of Retardation Values>

$$Ro = (nx - ny) \times d$$

$$Rth = \{(nx + ny)/2 - nz\} \times d$$

(in the formula, nx, ny, nz represent refractive indexes in the principal axes of the index ellipsoid x, y, and z, respectively, while nx and ny represent film in-plane refractive indexes and nz represents a refractive index in the film thickness direction, nx>ny, and d is a thickness (nm) of a film.)

With an Abbe refraction index meter equipped with an eye piece with a polarizing plate and a spectrum light source, a refraction index was measured in one direction, the direction perpendicular to the one direction, and the direction vertical to the film surface on both surfaces of an optical film, and an average refraction index is determined from the average value of these measurements. Further, the thickness of the film was measured using a commercially-available micrometer.

Films were left uncontrolled for 24 hours under the environment of 23° C. and 55% RH, and thereafter retardation of the films were measured by the use of an automatic birefringence analyzer (KOBRA-21ADH manufactured by Oji Scientific Instruments) under the above environment with a wavelength of 590 nm. The above-mentioned refraction index and the thickness were input into the above formulas, hereby determining an in-plane retardation value (Ro) and a thickness direction retardation value (Rth).

<Measurement of Internal Haze>

A solvent having a refractive index within ±0.05 of the refractive index of the film was dropped on the film interface to bring into the condition where the haze at the surface of the film could be disregarded as much as possible, and the haze was measured by using the haze meter described below under a circumstance of 23° C. and 55% RH.

<Measurement Apparatus of Haze of Film Inside (Hereafter, Also Referred to as an Internal Haze)>

Haze meter (turbidity meter) (Model: NDH 2000 produced by Nippon Denshoku Industries Co., Ltd.)

A 5V9W halogen lamp as a light source and a silicon photo cell (equipped with a relative lumninocity filter) as a light receiver were used.

In the present invention, it is one of the features that, in a haze measurement in which a solvent having a refractive index within ±0.05 of the refractive index of the film is used as a film interface, the haze value is 0.02 or less. The measurement was carried out according to JIS K-7136.

The measurement of haze is conducted as described below, which will be explained with reference to FIGS. 1 to 4.

First, blank haze 1 of a measuring instrument other than the film is measured.

1. On a cleaned slide glass, one drop of glycerin (0.05 ml) is placed. At this time, care should be taken not to include air bubbles. A slide glass cleaned with a detergent is used since a slide glass may be stained even when it looks clean (refer to FIG. 1).
2. A cover glass is placed on it. Glycerin will be spread without pressing the cover glass.
3. The slide glass is set to a haze meter to measure blank haze 1.

Subsequently, haze 2 including the specimen is measured according to the following procedure.

Figure 2:
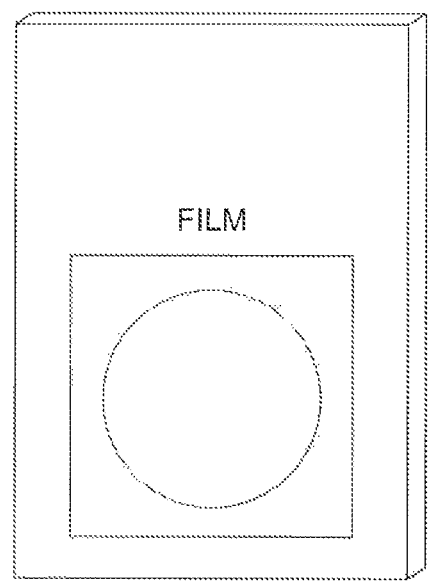
FIG. 2 is a schematic drawing illustrating a state when a sample film is placed on the glycerin.
Figure 3:
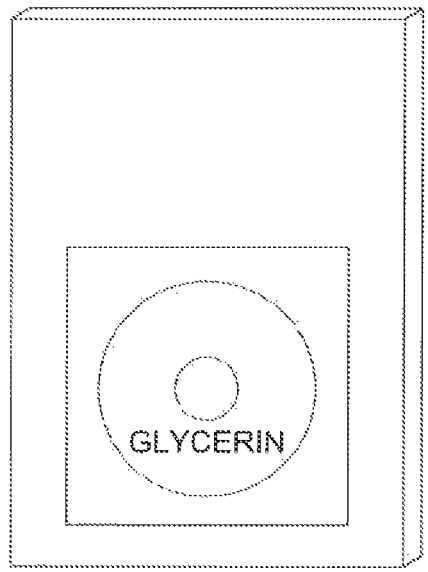
FIG. 3 is a schematic drawing illustrating a state when glycerin is dropped on the sample film.
Figure 4:
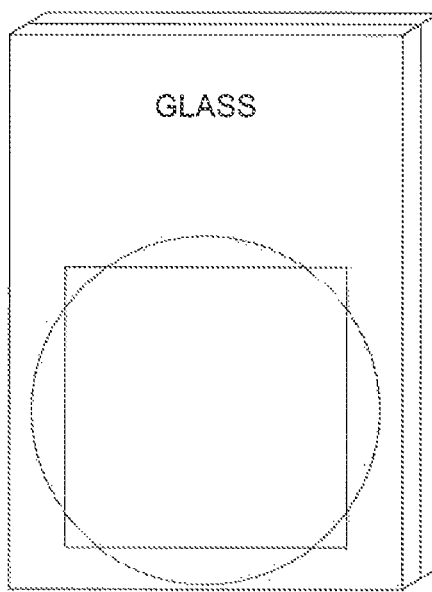
FIG. 4 is a schematic drawing illustrating a state when a cover glass is placed on the glycerin.
Figure 5A:
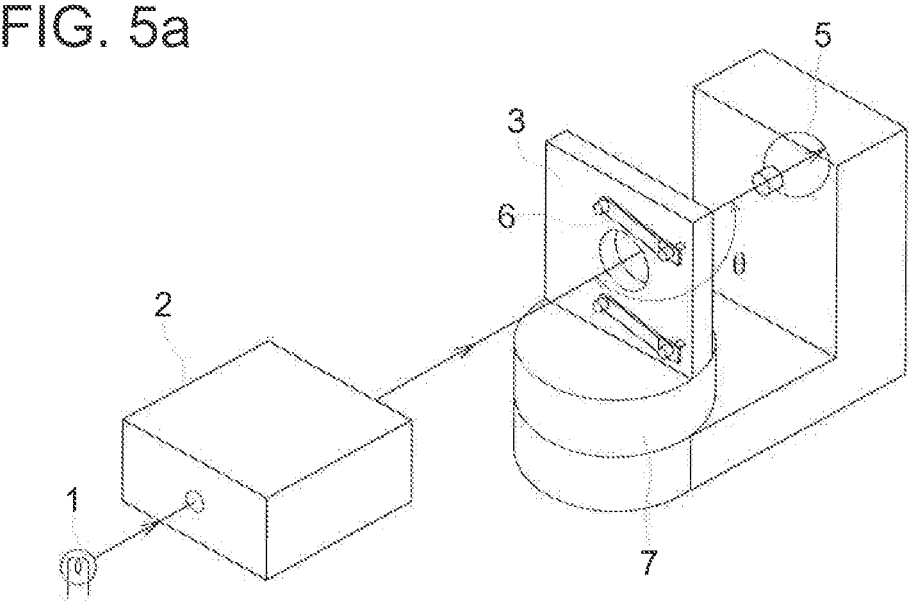
FIG. 5 is a schematic drawing of a goniophotometer.
Figure 5B:
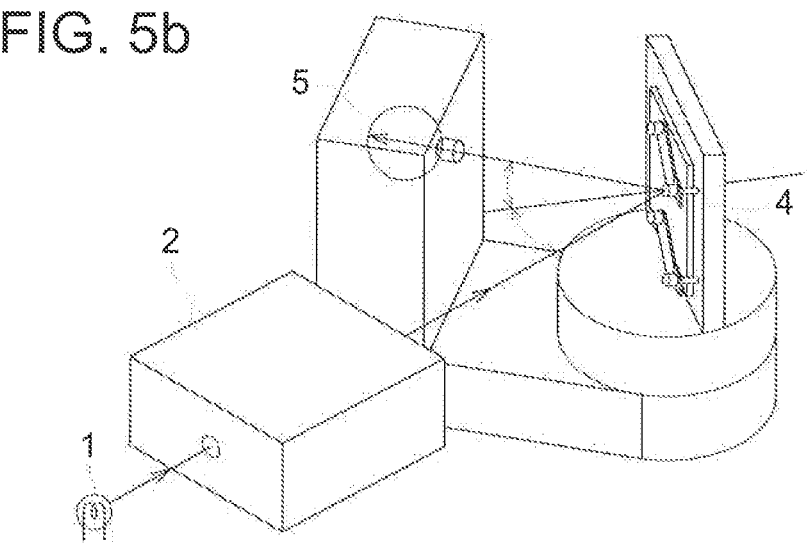

4. Glycerin (0.05 ml) is dropped on a slide glass. Refer to FIG. 1.
5. A sample film to be measured is placed on it. Refer to FIG. 2.
6. Glycerin (0.05 ml) is dropped on the sample film. Refer to FIG. 3.
7. A cover glass is placed on it. Refer to FIG. 4.
8. The laminate obtained as above is set to a haze meter to measure haze 2.
9. (Haze 2)-(Haze 1)=(the internal haze of the present invention) is calculated.

The glass and the glycerin used in the above measurement are as follows.

Glass: MICRO SLIDE GLASS S9213 MATSUNAMI

Glycerol: Cica best grade (purity >99.0%), refractive index 1.47

<Measurement of Internal Scattering>

Internal scattering means an average value of scattering light intensities in the slow axis direction of the film and in the direction perpendicular to that direction, and the front contrast can be adjusted to a desired value by averaging the anisotropic scattering in the slow axis direction and in the direction perpendicular to that direction. Internal scattering was measured according to the following direction.

<<Integrated Scattered Light Intensity>>

The scattered light intensity was measured by the use of a goniophotometer, type: GP-1-3D, manufactured by Optic corporation (a light source was a 12V50W halogen lamp, and a light receiving section was a photomultiplier tubes (Photomul, Hamamatsu photonics R636-10)).

The integrated value was determined by summing up the integrated scattered light intensities determined in every 1° in the range of 35° of the center of θ=130° while the incident angle was 90°.

The sample was measured on the conditions in which the slow axis of the film was fixed horizontally and vertically to the sample stand, respectively.

<Measurement of Moisture Permeability>

The moisture permeability was measured according to the cup method described in JIS Z 0208B at 40° C. under 90% RH.

whereby a web was cast. Thereafter, the web was dried and heat treated to prepare PVA film.

The obtained PVA film had a mean thickness of 25 μm, a moisture content of 4.4% and a film width of 3 m. The above-described PVA film was continuously processed with a preliminary swelling, dying, uniaxial stretching by a wet method, a fixing treatment, drying and a heat treatment in this order, whereby polarizer film was prepared.

Namely, the PVA film was subjected to a preliminary swelling by being immersed in water at 30° C. for 30 seconds, and was immersed in a aqueous solution, having a iodine concentration of 0.4 g/litter and a potassium iodide concentration of 40 g/litter, at 35° C. for 3 minutes. Successively,

TABLE 2

| Optical film No. | Cellulose acetate α | ** | β | ** | Retardation value/nm Ro | Rth | Rth/Ro | Sugar ester compound C Kind | ** | Polyester D Kind | ** | Other compound Kind | ** | Kind | ** | Internal haze/% | Internal scattering | Moisture permeability 40° C., 90%, 24 h | Remarks |
|---|---|---|---|---|---|---|---|---|---|---|---|---|---|---|---|---|---|---|---|
| 101 | B | 50 | D | 50 | 52 | 125 | 2.4 | 4 | 10 | 21 | 2.5 | — | — | — | — | 0.02 | 0.2 | 1200 | Inv. |
| 102 | B | 60 | F | 40 | 55 | 130 | 2.4 | 4 | 8 | 21 | 4 | — | — | — | — | 0.02 | 0.3 | 1230 | Inv. |
| 103 | B | 70 | L | 30 | 50 | 130 | 2.6 | 4 | 10 | 13 | 2.5 | — | — | — | — | 0.02 | 0.3 | 1250 | Inv. |
| 104 | H | 50 | D | 50 | 51 | 125 | 2.5 | 3 | 10 | 13 | 2.5 | — | — | — | — | 0.02 | 0.2 | 1190 | Inv. |
| 105 | J | 40 | D | 60 | 50 | 125 | 2.5 | 4 | 10 | 13 | 2.5 | — | — | — | — | 0.02 | 0.2 | 1250 | Inv. |
| 106 | M | 30 | D | 70 | 50 | 125 | 2.5 | 4 | 10 | 5 | 2.5 | — | — | — | — | 0.02 | 0.2 | 1260 | Inv. |
| 107 | H | 20 | F | 80 | 50 | 125 | 2.5 | 4 | 10 | 5 | 2.5 | — | — | — | — | 0.02 | 0.2 | 1250 | Inv. |
| 108 | J | 50 | F | 50 | 50 | 125 | 2.5 | 3 | 10 | 1 | 2.5 | — | — | — | — | 0.02 | 0.2 | 1250 | Inv. |
| 109 | M | 50 | F | 50 | 50 | 103 | 2.1 | 3 | 10 | 13 | 2.5 | — | — | — | — | 0.02 | 0.2 | 1250 | Inv. |
| 110 | H | 10 | L | 90 | 55 | 135 | 2.5 | 3 | 10 | 13 | 2.5 | — | — | — | — | 0.02 | 0.2 | 1250 | Inv. |
| 111 | H | 90 | K | 10 | 45 | 125 | 2.8 | 3 | 6 | 21 | 6 | — | — | — | — | 0.02 | 0.2 | 1250 | Inv. |
| 112 | A | 50 | D | 50 | 50 | 125 | 2.5 | 4 | 10 | 1 | 2.5 | — | — | — | — | 0.02 | 0.3 | 1280 | Inv. |
| 113 | A | 50 | B | 50 | 50 | 125 | 2.5 | 4 | 10 | 21 | 2.5 | — | — | — | — | 0.02 | 0.3 | 1290 | Inv. |
| 114 | A | 50 | H | 50 | 55 | 125 | 2.3 | 4 | 10 | 13 | 2.5 | — | — | — | — | 0.02 | 0.3 | 1285 | Inv. |
| 115 | A | 50 | J | 50 | 50 | 125 | 2.5 | 4 | 10 | 5 | 2.5 | — | — | — | — | 0.02 | 0.3 | 1250 | Inv. |
| 116 | B | 50 | K | 50 | 50 | 125 | 2.5 | 4 | 10 | 21 | 2.5 | — | — | — | — | 0.02 | 0.3 | 1210 | Inv. |
| 117 | J | 50 | L | 50 | 52 | 125 | 2.4 | 4 | 10 | 21 | 2.5 | — | — | — | — | 0.02 | 0.3 | 1200 | Inv. |
| 118 | C | 50 | E | 50 | 50 | 125 | 2.5 | — | — | — | — | TMPTB | 5 | TNBC | 5 | 0.15 | 1.4 | 1450 | Comp. |
| 119 | G | 50 | I | 50 | 50 | 125 | 2.5 | — | — | — | — | TPP | 8 | EPEG | 2 | 0.13 | 1.3 | 1470 | Comp. |
| 120 | H | 50 | F | 50 | 50 | 125 | 2.5 | — | — | — | — | TPP | 3 | EPEG | 3 | 0.05 | 0.6 | 1520 | Comp. |
| 121 | B | 50 | D | 50 | 50 | 125 | 2.5 | — | — | — | — | TMPTB | 6 | TNBC | 6 | 0.06 | 0.5 | 1500 | Comp. |
| 122 | C | 50 | E | 50 | 45 | 125 | 2.8 | 4 | 10 | 22 | 2.5 | — | — | — | — | 0.06 | 0.6 | 1230 | Comp. |
| 123 | C | 50 | G | 50 | 30 | 80 | 2.7 | 4 | 10 | 1 | 2.5 | — | — | — | — | 0.06 | 0.5 | 1250 | Comp. |
| 124 | I | 60 | E | 40 | 28 | 80 | 2.9 | 4 | 10 | 13 | 2.5 | — | — | — | — | 0.06 | 0.4 | 1215 | Comp. |
| 125 | B | 40 | E | 60 | 52 | 100 | 1.9 | 4 | 8 | 13 | 4 | — | — | — | — | 0.04 | 0.5 | 1250 | Comp. |
| 126 | B | 30 | G | 70 | 90 | 225 | 2.5 | 4 | 10 | 1 | 2.5 | — | — | — | — | 0.05 | 0.5 | 1210 | Comp. |
| 127 | I | 50 | D | 50 | 92 | 220 | 2.4 | 4 | 10 | 5 | 2.5 | — | — | — | — | 0.04 | 0.4 | 1205 | Comp. |
| 128 | C | 20 | F | 80 | 55 | 170 | 3.1 | 3 | 10 | 1 | 2.5 | — | — | — | — | 0.05 | 0.5 | 1290 | Comp. |
| 129 | B | 80 | O | 20 | 40 | 120 | 3.0 | 1 | 10 | 1 | 2.5 | — | — | — | — | 0.07 | 0.6 | 1350 | Comp. |
| 130 | P | 50 | A | 30 | 29 | 70 | 2.4 | 3 | 6 | 1 | 6 | — | — | — | — | 0.07 | 0.7 | 1210 | Comp. |
| 131 | Q | 50 | O | 50 | 10 | 55 | 5.5 | 3 | 10 | 22 | 2.5 | — | — | — | — | 0.1 | 1.0 | 1270 | Comp. |

** Mass parts, Inv.: Inventive, Comp.: Comparative

As shown in Table 2, the optical film of the present invention exhibits excellent moisture resistance, and small internal haze and internal scattering.

Example 2

Polarizing plates were prepared using Hard coat film 1 and optical film samples as polarizing plate protective films, prepared in Example 1 to evaluate the properties of liquid crystal display.

<Preparation of Polarizing Plate 201>
(Alkali Saponification Treatment)
(a) Preparation of Polarizer One hundred mass parts of polyvinyl alcohol (hereinafter, abbreviated as PVA), having a saponification degree of 99.95 mol % and a polymerization degree of 2,400, which had been impregnated with 10 mass parts of glycerin and 170 mass parts of water, was melt kneaded, and was melt extruded on a metal roll through a T die after having been deformed, uniaxial stretching to 6 times was performed in a aqueous solution having a boric acid concentration of 4% at 50° C. under a condition of a tension applied to film of 700 N/m, and a fixing treatment was performed by immersion in an aqueous solution having a potassium iodide concentration of 40 g/litter, a boric acid concentration of 40 glitter and a zinc chloride concentration of 10 g/litter at 30° C. for 5 minutes.

Thereafter, the PVA film was taken out to be dried with a hot wind at 40° C. and was further subjected to a heat treatment at 100° C. for 5 minutes. The polarizer film prepared had a mean thickness of 13 μm; a transmittance of 43.0%, a polarizing degree of 99.5% and a dichroic ratio of 40.1, with respect to polarizing characteristics.

(b) Preparation of Polarizing Plate

Next, according to following processes 1-4, Optical film 101, Hard coat film 1 were laminated to prepare Polarizing plate 201.

Process 1: Aforementioned polarizer was immersed in a polyvinyl alcohol adhesive solution, of which solid content was 2% by mass, for 1 to 2 seconds.

Process 2: An alkali saponification treatment was conducted on Optical film 101 and Hard coat film 1 adhered with a peelable protective film (made from PET) on the hard coat layer under the condition described below. Subsequently, excess adhesive adhered on polarizer film immersed in the polyvinyl alcohol adhesive solution in process 1 was softly removed and the resulting polarizer film was sandwiched between Optical film 101 and Hard coat film 1 from the both surfaces to be accumulated.
(Alkali Saponification Treatment)

| Saponification rocess | 1.5M-KOH | 50° C. | 45 seconds |
| Water washing process | Water | 30° C. | 60 seconds |
| Nuetrlization process | 10 mass parts HCl | 30° C. | 45 seconds |
| Water washing process | Water | 30° C. | 60 seconds |

After the saponification treatment was over, water washing neutralization and water washing were conducted in that order, and then dried at 100° C.

Process 3: The laminated substance was pasted up by two rotating rollers at a pressure of 20-30 N/cm$^2$ and a speed of approximately 2 m/min. At this time, a caution was paid not to introduce bubbles.

Process 4: The sample prepared in process 3 was dried in a drier at 80° C. for 2 minutes, whereby a polarizing plate was prepared.

Process 5: On the Optical film 101 side of the polarizing plate prepared in Process 4, a commercially available acrylic adhesive was applied so as to form a dry thickness of 25 μm, and the product was dried in a 110° C. oven for 5 minutes to form an adhesive layer, followed by adhering an exfoliative protective film on the adhesive layer. The obtained polarizing plate was cut (punched) into a size of 576×324 mm to obtain Polarizing plate 201.

<Preparation of Polarizing Plate 202>

Polarizing plate 202 was prepared in the same manner as the preparation of Polarizing plate 201, except that Hard coat film 1 was changed to Hard coat film 2.

<Preparation of Polarizing Plates 203 to 232>

Polarizing plates 203 to 232 each were prepared in the same manner as the preparation of Polarizing plate 201, except Optical film 1 was changed to Optical films 102 to 131, respectively.

<Preparation of Liquid Crystal Display Device 401>

Figure 6:
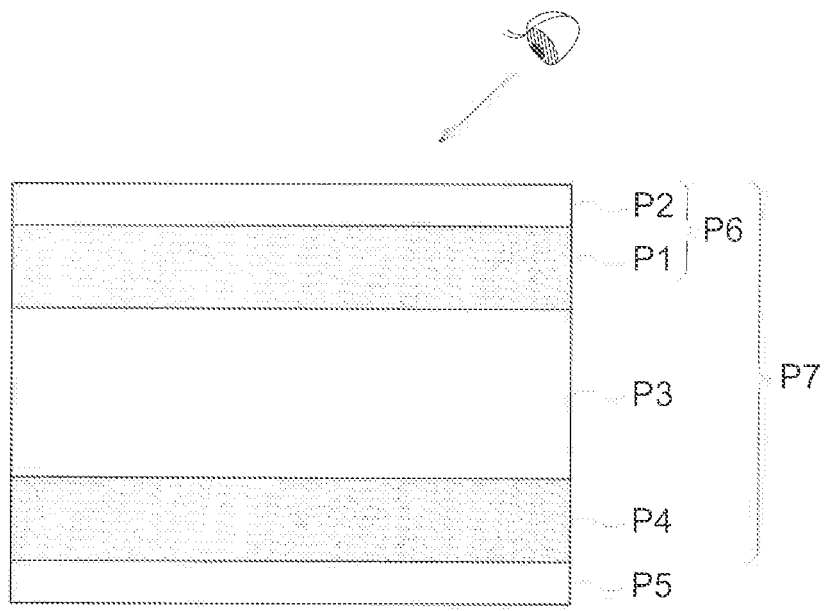
FIG. 6 is a schematic drawing of a liquid crystal display device employing the optical film of the present invention.

The polarizing plate of a 40 size display KDL-40V5 produced by SONY Corp. was removed, and, as a polarizing plate of the viewer's side, Polarizing plate 201 prepared as described above was laminated, in which adhesive layer 5 and liquid crystal cell glass were adhered (refer to FIG. 6 for the constitution).

<Preparation of Liquid Crystal Display Devices 402 to 432>

Liquid crystal display devices 402 to 432 each were prepared in the same manner as the preparation of Polarizing plate 401, except Optical film 1 was changed to Optical films 102 to 131, respectively.

<<Evaluation>>

Above prepared Optical films 101 to 131, Polarizing plates 201 to 232 and Liquid crystal display devices 401 to 432 were subjected to the following evaluation.

<Polarizing Plate>

For each of polarizing plates 201 to 232, the exfoliative protective film was removed, and 50 sheets of each polarizing plate were stacked, while the polarizing plate at the bottom was further adhered to the glass plate through the adhesive layer. The stacked polarizing plates were stored for 240 hours under the condition of 80° C. and 90%.

<Observation of Deformation Defect>

The polarizing plates subjected to the durability test were observed from the hard coat layer side to evaluate the condition of deformation defect according to the following criteria.

A: No occurrence of deformation defect was observed.

B: Deformation defects were observed at limited portions, however, practically acceptable.

C: Deformation defects were partially observed, which were practically problematic.

D: Partial deformation defects were clearly observed even from a distance.

<Evaluation of Display Performance of Liquid Crystal Display Device>

<Evaluation of Streaks>

In order to observe thermal deterioration of each of above prepared Liquid crystal display devices 401 to 432, each liquid crystal display device was treated at 60° C. for 300 hours, and brought back to the condition of 23° C., and 55% RH. Then, streaks observed in black display, two hours after the electric power was switched on to put on the backlight, were visually evaluated according to the following criteria.

A: No streak was observed.

B: Dark streaks were observed at the center.

C: Weak streaks from the center to the edge portion were observed.

D: Strong streaks were observed on all over the screen.

With respect to the streaks, evaluation of B or better is acceptable.

<Evaluation of Visibility>

Each of the above prepared liquid crystal display device was treated at 60° C. under 90% RH for 100 hours, and brought back to the condition of 23° C., and 55% RH. Then, the surface of the display device was visually observed, and evaluation was conducted according to the following criteria.

A: No wavy unevenness was observed on the surface.

B: Slight wavy unevenness was observed on the surface.

C: Minute wavy unevenness was observed a bit on the surface.

D: Minute wavy unevenness was observed on the surface.

<Evaluation of Color Hue Variation>

For each of the above prepared liquid crystal display devices, color hue variation was measured using a measuring device (EG-Contrast160D, produced by ELDIM). In the CIE1976, UCS coordinate, the maximum color hue variation width Δu'v' in the up-down directions (namely, the directions from 80° upper from the normal direction to 80° lower from the normal direction) was compared.

<Evaluation of Front Contrast>

After the backlight of each liquid crystal display device was continuously put on for a week. under the condition of 23° C. and 55% RH, measurement of front contrast was conducted. In the measurement, the luminance from the normal direction of the display screen on both the white display and the black display was measured, and the ratio thereof was employed as the front contrast.

Front contrast=(Luminance in the white display measured from the normal direction of the display device)/(Luminance in the black display measured from the normal direction of the display device)

Obtained results were shown in Table 3.

TABLE 3

| Polarizing plate | | | Evaluation | | | | |
|---|---|---|---|---|---|---|---|
| | | | Liquid crystal display device | | | | |
| Polarizing plate No. | Optical film | Observation of deformation defects | No. | Visibility | Streaks | Color hue variation | Front contrast | Remarks |
| 201 | 101 | A | 401 | A | A | 0.05 | 1190 | Inv. |
| 202 | 101 | A | 402 | A | A | 0.06 | 1170 | Inv. |
| 203 | 102 | A | 403 | A | A | 0.06 | 1170 | Inv. |
| 204 | 103 | B | 404 | B | B | 0.06 | 1140 | Inv. |
| 205 | 104 | B | 405 | B | B | 0.07 | 1140 | Inv. |
| 206 | 105 | A | 406 | A | A | 0.06 | 1180 | Inv. |
| 207 | 106 | B | 407 | B | B | 0.06 | 1140 | Inv. |
| 208 | 107 | B | 408 | B | B | 0.06 | 1140 | Inv. |
| 209 | 108 | B | 409 | B | B | 0.05 | 1160 | Inv. |
| 210 | 109 | B | 410 | B | B | 0.06 | 1140 | Inv. |
| 211 | 110 | B | 411 | B | B | 0.05 | 1140 | Inv. |
| 212 | 111 | B | 412 | B | B | 0.17 | 1140 | Inv. |
| 213 | 112 | A | 413 | A | A | 0.05 | 1190 | Inv. |
| 214 | 113 | A | 414 | A | A | 0.05 | 1175 | Inv. |
| 215 | 114 | A | 415 | A | A | 0.05 | 1165 | Inv. |
| 216 | 115 | A | 416 | A | A | 0.05 | 1195 | Inv. |
| 217 | 116 | A | 417 | A | A | 0.05 | 1175 | Inv. |
| 218 | 117 | B | 418 | B | B | 0.05 | 1190 | Inv. |
| 219 | 118 | D | 419 | C | C | 0.17 | 870 | Comp. |
| 220 | 119 | D | 420 | D | D | 0.17 | 820 | Comp. |
| 221 | 120 | D | 421 | C | D | 0.15 | 810 | Comp. |
| 222 | 121 | C | 422 | D | D | 0.16 | 815 | Comp. |
| 223 | 122 | C | 423 | D | D | 0.09 | 920 | Comp. |
| 224 | 123 | C | 424 | D | C | 0.09 | 940 | Comp. |
| 225 | 124 | D | 425 | D | D | 0.09 | 860 | Comp. |
| 226 | 125 | D | 426 | D | D | 0.09 | 1020 | Comp. |
| 227 | 126 | C | 427 | C | C | 0.05 | 1000 | Comp. |
| 228 | 127 | D | 428 | D | D | 0.12 | 900 | Comp. |
| 229 | 128 | D | 429 | D | D | 0.09 | 920 | Comp. |
| 230 | 129 | C | 430 | C | C | 0.21 | 880 | Comp. |
| 231 | 130 | C | 431 | C | C | 0.22 | 780 | Comp. |
| 232 | 131 | D | 432 | D | D | 0.2 | 690 | Comp. |

Inv.: Inventive, Comp.: Comparative

From Table 3, it is clear that, by employing the optical film of the present invention, a polarizing plate exhibiting excellent moisture resistance can be obtained, and the liquid crystal display device exhibits sufficient front contrast.

EXPLANATION OF NUMERALS

1 Light source lamp
2 Spectroscope
3 Sample holder (Stage)
4 Sample
5 Light receiving portion
θ Angle between normal direction of light source and direction connecting observation point of the sample and integrating sphere
P1 Cellulose triacetate film
P2 Hard coat layer
P3 Polarizer film
P4 Optical film of the present invention
P5 Adhesive layer
P6 Hard coat film
P7 Polarizing plate

What is claimed is:

1. An optical film comprising:
   cellulose acetate α having a 6% viscosity of 70 to 250 mPa·s measured at 25° C. ±1° C. and an acetyl substitution degree of 2.0 or more but less than 2.5;
   cellulose acetate β having a 6% viscosity smaller than the 6% viscosity of cellulose acetate α, and an acetyl substitution degree of 2.0 or more but less than 2.5;
   ester compound C having one or more but twelve or less of at least one kind of a pyranose structure and a furanose structure, all of or a part of OH groups of the at least one kind of a pyranose structure and a furanose structure being esterified; and
   polyester D represented by following Formula (1), $$B\text{-}(G\text{-}A)_n\text{-}G\text{-}B \qquad \text{Formula (1)}$$

wherein B represents an arylcarboxylic acid residue, G represents an alkylene glycol residue having 2 to 12 carbon atoms, an aryl glycol residue having 6 to 12 carbon atoms, or an oxyalkylene glycol residue having 4 to 12 carbon atoms, A represents an alkylene dicarboxylic acid residue having 4 to 12 carbon atoms, or an aryl dicarboxylic acid residue having 6 to 12 carbon atoms, and n represents an integer of 1 or more.

2. The optical film of claim 1, wherein both of cellulose acetates α and β are produced employing a wooden pulp cellulose as a raw material.

3. The optical film of claim 1, wherein
   an in-plane retardation value measured at a wavelength of 590 nm Ro (590) is 30 nm or more but 90 nm ore less,
   a ratio of a retardation value in the thickness direction of the optical film measured at the wavelength of 590 nm Rth (590) to the in-plane retardation value (590) {Rth (590)/Ro(590)} is 2.0 or more but 3.0 or less, $$Ro=(nx-ny)\times d$$

$$Rth=\{(nx+ny)/2-nz\}\times d$$

in the formulas, nx represents an in-plane refractive index in a slow axis direction, ny represents an in-plane refractive index in a fast axis direction, nz represents a refractive index in the thickness direction of the optical film and d represents a thickness of the optical film (nm).

* * * * *